US 11,784,869 B2

(12) United States Patent
Landais et al.

(10) Patent No.: US 11,784,869 B2
(45) Date of Patent: Oct. 10, 2023

(54) METHOD, APPARATUS, AND COMPUTER PROGRAM PRODUCT FOR ERROR HANDLING FOR INDIRECT COMMUNICATIONS

(71) Applicant: NOKIA TECHNOLOGIES OY, Espoo (FI)

(72) Inventors: Bruno Landais, Pleumeur-Bodou (FR); Saurabh Khare, Bangalore (IN); Alex Moukalled, Naperville, IL (US); Ioannis Mouroulis, Athens (GR)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/205,892

(22) Filed: Mar. 18, 2021

(65) Prior Publication Data
US 2021/0306203 A1    Sep. 30, 2021

(30) Foreign Application Priority Data
Mar. 27, 2020  (IN) .............................. 202041013452

(51) Int. Cl.
*H04L 41/0631* (2022.01)
(52) U.S. Cl.
CPC ............................... *H04L 41/0645* (2013.01)
(58) Field of Classification Search
None
See application file for complete search history.

(56) References Cited

U.S. PATENT DOCUMENTS

| | | | | |
|---|---|---|---|---|
| 10,764,214 | B1* | 9/2020 | Plenderleith | H04L 41/064 |
| 10,772,062 | B1* | 9/2020 | Albasheir | H04W 48/16 |
| 10,833,938 | B1* | 11/2020 | Rajput | H04L 67/1095 |
| 2019/0281587 | A1 | 9/2019 | Zhang et al. | |
| 2021/0092005 | A1* | 3/2021 | Kaul | H04L 43/0847 |
| 2021/0112012 | A1* | 4/2021 | Krishan | H04L 47/30 |

(Continued)

FOREIGN PATENT DOCUMENTS

CN      110582121 A    12/2019

OTHER PUBLICATIONS

First Examination Report for Indian Application No. 202041013452 dated Nov. 2, 2021, 6 pages.
(Continued)

*Primary Examiner* — Mohamed Ibrahim
(74) *Attorney, Agent, or Firm* — ALSTON & BIRD LLP

(57) ABSTRACT

A method, apparatus, and computer program product provide for network communication error originator identification with a header, such as an HTTP header. In the context of a method, the method causes a service request from a NF client to be transmitted to a NF server via one or more intermediary network proxy functions. The method receives a service response with error information identifying the type or identity of the originator of the error response or identifying the type or identity of network proxy function having relayed the error response. The method may also be enabled to redirect a service request to a different NF server or a different network proxy function, and to enable the NF client to determine whether to redirect the request to a different NF server or a different network proxy function.

17 Claims, 11 Drawing Sheets

(56) References Cited

U.S. PATENT DOCUMENTS

2021/0204200 A1* 7/2021 Krishan .............. H04L 41/5058

OTHER PUBLICATIONS

Extended European Search Report for European Application No. 21162333.5 dated Aug. 12, 2021, 11 pages.

Fielding et al., "Hypertext Transfer Protocol (HTTP/1.1): Semantics and Content", Internet Engineering Task Force (IETF), Request for Comments: 7231, (Jun. 2014), 101 pages.

Fielding et al., "Hypertext Transfer Protocol (HTTP/1.1): Message Syntax and Routing", Internet Engineering Task Force (IETF), Request for Comments: 7230, (Jun. 2014), 89 pages.

"3rd Generation Partnership Project; Technical Specification Group Core Network and Terminals; 5G System; Principles and Guidelines for Services Definition; Stage 3 (Release 16)", 3GPP TS 29.501 v16.2.0 (Dec. 2019), 71 pages.

"3rd Generation Partnership Project; Technical Specification Group Core Network and Terminals; 5G System; Technical Realization of Service Based Architecture; Stage 3 (Release 16)", 3GPP TS 29.500 v16.2.1 (Jan. 2020), 50 pages.

"3rd Generation Partnership Project; Technical Specification Group Services and System Aspects; Procedures for the 5G System (5GS); Stage 2 (Release 16)" 3GPP TS 23.502 v16.3.0 (Dec. 22, 2019), 558 pages.

"3rd Generation Partnership Project; Technical Specification Group Services and System Aspects; System architecture for the 5G System (5GS); Stage 2 (Release 16)", 3GPP TS 23.501 v16.3.0 (Dec. 2019), 417 pages.

Office Action for Japanese Application No. 2021-040888 dated Jun. 16, 2022, 14 pages.

Office Action for Japanese Application No. 2021-040888 dated Jan. 10, 2022, 7 pages.

"3rd Generation Partnership Project; Technical Specification Group Core Network and Terminals; 5G System; Technical Realization of Service Based Architecture; Stage 3 (Release 16)", 3GPP TS 29.500 v16.6.0, (Dec. 2020), 85 pages.

Nokia et al., "Error Handling for Indirect Communications", 3GPP TSG-CT WG4 Meeting #97e, C4-202454, (Apr. 15-24, 2020), 5 pages.

Office Action for Chinese Application No. 202110326439.3 dated Oct. 10, 2022, 9 pages.

Office Action for Chinese Application No. 202110326439.3 dated Jul. 20, 2023, 8 pages.

* cited by examiner

METHOD, APPARATUS, AND COMPUTER PROGRAM PRODUCT FOR ERROR HANDLING FOR INDIRECT COMMUNICATIONS

CROSS-REFERENCE TO RELATED APPLICATIONS

This application claims priority to Indian Patent Application No. 202041013452, filed Mar. 27, 2020, the entire contents of which are incorporated herein by reference.

TECHNOLOGICAL FIELD

An example embodiment relates generally to error handling for indirect communication in a communication network, and more particularly to identifying the source of the error so as to adapt subsequent communications according to the originator of the error.

BACKGROUND

A communication system can be seen as a facility that enables communication sessions between two or more entities such as user terminals, base stations/access points, Network Functions (NF) and/or other nodes by providing communication between the various entities involved in the communications path. A communication system can be provided for example by means of a communication network and one or more compatible communication devices. Telecommunication networks, such as the fifth generation of mobile networks (5G networks) are expected to be the next major phase of mobile telecommunication standards and to bring many improvements in mobile network user experience. For instance, 5G networks should provide new technical solutions allowing a greater throughput, lower latency, higher reliability, higher connectivity, and higher mobility range. In addition to these improvements in terms of performance, 5G networks are also expected to extend the flexibility in the network usage and to provide users with a wider range of use cases and business models.

The 3rd Generation Partnership Project (3GPP) is a standards organization which develops protocols for mobile telephony and is known for the development and maintenance of various standards including second generation (2G), third generation (3G), fourth generation (4G), Long Term Evolution (LTE), and fifth generation (5G) standards. The 5G Core (5GC) network has been designed as a Service Based Architecture (SBA), e.g., a system architecture in which the system functionality is achieved by a set of NFs providing services to other authorized NFs to access their services. As such, NF clients (e.g., a NF service consumer, or HTTP client, issuing a service request or a NF Service Producer, or HTTP client, sending a notification request) send service requests to NF servers (e.g., a NF Service Producer or NF Service Consumer respectively, or HTTP server). From 3GPP release 16 onwards, the 3GPP's enhanced Service Based Architecture (eSBA) introduces, among other features, the support of indirect communication between an NF client and an NF server, or between a network function (NF) service consumer and a NF service producer via one or more service communication proxy (SCP) entities. The technical realization of support of indirect communication introduces issues associated with the identification of the originator of an error as between the NF server and the one or more intermediary entities which renders any further processing of a request inefficient as the request may again be submitted via the same entity that was the source of the original error. Specifically, for indirect communications between a 5G core network (5GC) NF via SCPs, and more generally for communications between a 5GC NF via any intermediate entities, if the NF client or an intermediate entity sending a service request cannot assign an error response to the intermediate entity or to the NF server that originated the error, this prevents the NF client or intermediate entity from adapting the communication behavior based on the originator of the error and thus the actual error and the NF client or intermediate entity cannot adapt subsequent communications accordingly, thus the system logic cannot work correctly to establish communications.

BRIEF SUMMARY

A method, apparatus, and computer program product are disclosed for the identification of network communication error origination via the insertion of an indication of the error originating network entity into the error response, or via an indication that an error response has been relayed by an intermediate entity, such as an error information included within the error response which is returned to the NF client via an intermediate entity. The NF client can then apply appropriate error handling according to the originator of the error, e.g. retransmit the service request towards an alternative NF server or using an alternative network entity (e.g. SCP), e.g., via an alternative network pathway not associated with the identified network communication error origination entity. In some embodiments, the error information consists of an HTTP Via header further configured to indicate the type (e.g., SCP) or the identity (e.g. a Fully Qualified Domain Name (FQDN)) of the intermediate entity forwarding the error response, an HTTP Server header further configured to indicate the type (e.g., PCF, SCP, SEPP, etc.) or the identity (e.g., a FQDN or a NF instance Identity) of the originator of the error, or a new HTTP custom header containing the NF type and/or the identifier of the originator of the error (e.g., SCP FQDN or NF Instance ID), and/or the type or identifier of the entity forwarding the error (e.g., "SCP").

A method, apparatus, and computer program product are disclosed in accordance with one example embodiment for 3GPP networks, comprising service-based architecture, HTTP-based communication between network function (NF) service consumers, network proxy entities, and NF service producers. In some embodiments, respective communication-based error messages include information regarding which entity produced the error (e.g., identification of the originator of the communication error). In some embodiments, the error message includes information regarding which network entity forwarded the error message along the communication pathway to a plurality of other network entities. In some embodiments, new redirection information is transmitted in the response message to enable the NF client to determine whether this is a redirection request towards a different NF server or towards a different intermediate entity only, and thus to enable to redirect the service request in the network avoiding the reported error. In this regard, the redirection information may be generated by a network node based on previously received communication errors. In some embodiments, respective communication-based error message information is inserted into a protocol header to signal the communication redirection.

In an example embodiment, a method is provided that includes causing a service request for a network function server to be transmitted via at least one network proxy function, such as an SCP or a SEPP, and then receiving a service response comprising at least an error message. The method also includes determining from the service response, an originator of the error message and differently responding to the error message depending upon the originator of the error message.

The originator of the error message may be at least one of the network function server, a service communication proxy (SCP), a security edge protection proxy (SEPP), or any other network proxy function. In an instance in which the originator of the error message is the at least one network proxy function, the method responds differently by causing the service request to be transmitted to the network function server via a different network proxy function. In an instance in which the originator of the error message is a SEPP, the method responds differently by causing the service request to be transmitted to a network function server via a different SEPP. In an instance in which the originator of the error message is the network function server, the method responds differently by causing the service request to be transmitted to a different network function server using the same or different network proxy function.

In an example embodiment, the service response includes a header that includes an indication as to the originator of the error message or a header than includes an indication that the service response has been relayed by a network proxy function. In this regard, the service response may include an HTTP Via header that includes at least the indication of the type or the identity of the network proxy function relaying the service response, or an HTTP Server header that includes the type or the identity of the originator of the error message. In this example embodiment, the method determines from the service response the originator of the error message by determining that the originator of the error message is not the network proxy function that provided the service response in an instance in which the Via header indicates that the network proxy function forwarded the error message or in an instance in which the HTTP Server header identifies the type or identity of the network function server as the originator of the error message. The identity of the originator of the error message may include a fully qualify domain name (FQDN) or an NF instance identifier. The identity of the network proxy function relaying the service response is a fully qualify domain name (FQDN). In an example embodiment, the header consists of a custom header including the indication of the originator of the error message or the indication that the service response has been relayed by a network proxy function.

In another example embodiment, a method is provided that includes causing a service request for a network function server to be transmitted via at least one network proxy function; and then receiving a service response comprising at least an error message. The method also includes determining from the service response that the network proxy function was an originator of the error message and identifying another network proxy function to which the service request is to be redirected based on an identification of the another network proxy function with the error message. The method further includes redirecting the service request for the network function server via the another network proxy function.

The method of an example embodiment determines from the service response that the network proxy function was the originator of the error message by identifying an SCP_RE-DIRECTION protocol error in the error message. The method of this example embodiment also identifies another network proxy function to which the service request is to be redirected by identifying another network proxy function to which the service request is to be redirected based upon an identity of the another network proxy function included within a problem detail of the error message. The method of another example embodiment determines from the service response that the network proxy function was the originator of the error message by determining that the service response includes a Server header identifying the network proxy function. The method of this example embodiment also identifies another network proxy function to which the service request is to be redirected by identifying another network proxy function to which the service request is to be redirected based upon an identity of the another network proxy function included within a Location header of the service response.

In a further example embodiment, a method is provided that includes receiving a service request from a network function client and determining that an error condition exists relative to processing of the service request. The method also includes identifying an error message in relation to the error condition and causing a service response to be transmitted towards the network function client. The service response comprises at least an indication of an originator of the error message including a type or identity of the originator.

The service response may comprise a header that includes the indication as to the originator of the error message. In this regard, the service response may comprise an HTTP Server header that includes the type or the identity of the originator of the error message. The identity of the originator of the error message may a fully qualify domain name (FQDN) or a NF instance identifier. In an example embodiment, the header consists of a custom header including the indication of the originator of the error message.

In yet another example embodiment, a method is provided that includes causing a service request from a network function (NF) client to be relayed by a network proxy function toward a NF server and then receiving a service response including an error message and an indication of an originator of the error message. The method also includes modifying the service response to include an additional indication that the service response has been relayed by the network proxy function and causing the service response, as modified, to be sent to the NF client.

In an example embodiment, an apparatus is provided that comprises at least one processer; and at least one memory including computer program code with the at least one memory and the computer program code configured to, with the at least one processor, cause the apparatus to cause a service request for a network function server to be transmitted via at least one network proxy function and to receive a service response comprising at least an error message. The apparatus is also caused to determine from the service response, an originator of the error message and to differently respond to the error message depending upon the originator of the error message.

The originator of the error message may be at least one of the network function server, a service communication proxy (SCP), a security edge protection proxy (SEPP), or any other network proxy function. In an instance in which the originator of the error message is the at least one network proxy function, the apparatus is caused to respond differently by causing the service request to be transmitted to the network function server via a different network proxy function. In an instance in which the originator of the error message is a SEPP, the apparatus is caused to respond differently by causing the service request to be transmitted to a network function server via a different SEPP. In an instance in which the originator of the error message is the network function server, the apparatus is caused to respond differently by causing the service request to be transmitted to a different network function server using the same or different network proxy function.

In an example embodiment, the service response includes a header that includes an indication as to the originator of the error message or a header than includes an indication that the service response has been relayed by a network proxy function. In this regard, the service response may include an HTTP Via header that includes at least the indication of the type or the identity of the network proxy function relaying the service response, or an HTTP Server header that includes the type or the identity of the originator of the error message. In this example embodiment, the apparatus is caused to determine from the service response the originator of the error message by determining that the originator of the error message is not the network proxy function that provided the service response in an instance in which the Via header indicates that the network proxy function forwarded the error message or in an instance in which the HTTP Server header identifies the type or identity of the network function server as the originator of the error message. The identity of the originator of the error message may include a fully qualify domain name (FQDN) or an NF instance identifier. The identity of the network proxy function relaying the service response is a fully qualify domain name (FQDN). In an example embodiment, the header consists of a custom header including the indication of the originator of the error message or the indication that the service response has been relayed by a network proxy function.

In another example embodiment, an apparatus is provided that includes at least one processor and at least one memory including computer program code with the at least one memory and the computer program code configured to, with the at least one processor, cause the apparatus to cause a service request for a network function server to be transmitted via at least one network proxy function and to receive a service response comprising at least an error message. The apparatus is also caused to determine from the service response that the network proxy function was an originator of the error message and to identify another network proxy function to which the service request is to be redirected based on an identification of the another network proxy function with the error message. The apparatus is further caused to redirect the service request for the network function server via the another network proxy function.

The apparatus of an example embodiment is caused to determine from the service response that the network proxy function was the originator of the error message by identifying an SCP_REDIRECTION protocol error in the error message. The apparatus of this example embodiment is also caused to identify another network proxy function to which the service request is to be redirected by identifying another network proxy function to which the service request is to be redirected based upon an identity of the another network proxy function included within a problem detail of the error message. The apparatus of another example embodiment is caused to determine from the service response that the network proxy function was the originator of the error message by determining that the service response includes a Server header identifying the network proxy function. The apparatus of this example embodiment is also caused to identify another network proxy function to which the service request is to be redirected by identifying another network proxy function to which the service request is to be redirected based upon an identity of the another network proxy function included within a Location header of the service response.

In a further example embodiment, an apparatus is provided comprising at least one processor and at least one memory including computer program code with the at least one memory and the computer program code configured to, with the at least one processor, cause the apparatus to receive a service request from a network function client and to determine that an error condition exists relative to processing of the service request. The apparatus is also caused to identify an error message in relation to the error condition and to cause a service response to be transmitted towards the network function client. The service response comprises at least the error message and an indication of an originator of the error message including a type or identity of the originator.

The service response may comprise a header that includes the indication as to the originator of the error message. In this regard, the service response may comprise an HTTP Server header that includes the type or the identity of the originator of the error message. The identity of the originator of the error message may a fully qualify domain name (FQDN) or a NF instance identifier. In an example embodiment, the header consists of a custom header including the indication of the originator of the error message.

In yet another example embodiment, an apparatus is provided that comprises at least one processor and at least one memory including computer program code with the at least one memory and the computer program code configured to, with the at least one processor, cause the apparatus to cause a service request to be relayed from a network function (NF) client toward a NF server and to receive a service response including an error message and an indication of an originator of the error message. The apparatus is also caused to modify the service response to include an additional indication that the service response has been relayed via a network proxy function and to cause the service response, as modified, to be sent to the NF client.

In an example embodiment, a computer program product is provided that comprises a non-transitory computer readable storage medium having program code portions stored thereon with the program code portions configured, upon execution, to cause a service request for a network function server to be transmitted via a network proxy function and to receive a service response comprising at least an error message. The program code portions are also configured to determine from the service response, an originator of the error message and to differently respond to the error message depending upon the originator of the error message.

The originator of the error message may be at least one of the network function server, a service communication proxy (SCP), a security edge protection proxy (SEPP), or any other network proxy function. In an instance in which the originator of the error message is the at least one network proxy function, the program code portions configured to respond differently comprise program code portions configured to cause the service request to be transmitted to the network function server via a different network proxy function. In an instance in which the originator of the error message is a SEPP, the program code portions configured to respond differently comprise program code portions configured to cause the service request to be transmitted to a network function server via a different SEPP. In an instance in which the originator of the error message is the network function server, the program code portions configured to respond differently comprise program code portions configured to cause the service request to be transmitted to a different network function server using the same or different network proxy function.

In an example embodiment, the service response includes a header that includes an indication as to the originator of the error message or a header than includes an indication that the service response has been relayed by a network proxy function. In this regard, the service response may include an HTTP Via header that includes at least the indication of the type or the identity of the network proxy function relaying the service response, or an HTTP Server header that includes the type or the identity of the originator of the error message. In this example embodiment, the program code portions configured to determine from the service response the originator of the error message comprise program code portions configured determine that the originator of the error message is not the network proxy function that provided the service response in an instance in which the Via header indicates that the network proxy function forwarded the error message or in an instance in which the HTTP Server header identifies a type or identify of the network function server as the originator of the error message. The identity of the originator of the error message may include a fully qualify domain name (FQDN) or an NF instance identifier. The identity of the network proxy function relaying the service response is a fully qualify domain name (FQDN). In an example embodiment, the header consists of a custom header including the indication of the originator of the error message or the indication that the service response has been relayed by a network proxy function.

In another example embodiment, a computer program product is provided that comprises a non-transitory computer readable storage medium having program code portions stored thereon with the program code portions configured, upon execution, to cause a service request for a network function server to be transmitted via at least one network proxy function and to receive a service response comprising at least an error message. The program code portions are also configured to determine from the service response that the network proxy function was an originator of the error message and to identify another network proxy function to which the service request is to be redirected based on an identification of the another network proxy function with the error message. The program code portions are further configured to redirect the service request for the network function server via the another network proxy function.

In an example embodiment, the program code portions configured to determine from the service response that the network proxy function was the originator of the error message comprise program code portions configured to identify an SCP_REDIRECTION protocol error in the error message. In this example embodiment, the program code portions configured to identify another network proxy function to which the service request is to be redirected comprise program code portions configured to identify another network proxy function to which the service request is to be redirected based upon an identity of the another network proxy function included within a problem detail of the error message. In another example embodiment, the program code portions configured to determine from the service response that the network proxy function was the originator of the error message comprise program code portions configured to determine that the service response includes a Server header identifying the network proxy function. In this example embodiment, the program code portions configured to identify another network proxy function to which the service request is to be redirected comprise program code portions configured to identify another network proxy function to which the service request is to be redirected based upon an identity of the another network proxy function included within a Location header of the service response.

In a further example embodiment, a computer program product is provided that comprises a non-transitory computer readable storage medium having program code portions stored thereon with the program code portions configured, upon execution, to receive a service request from a network function service consumer and to determine that an error condition exists relative to processing of the service request. The program code portions are also configured to identify an error message in relation to the error condition and to cause a service response to be transmitted towards the network function service consumer. The service response comprises at least the error message and an indication of an originator of the error message including a type or identity of the originator.

The service response may comprise a header that includes the indication as to the originator of the error message. In this regard, the service response may comprise an HTTP Server header that includes the type or the identity of the originator of the error message. The identity of the originator of the error message may a fully qualify domain name (FQDN) or a NF instance identifier. In an example embodiment, the header consists of a custom header including the indication of the originator of the error message.

In yet another example embodiment, a computer program product is provided comprising a non-transitory computer readable storage medium having program code portions stored thereon with the program code portions configured, upon execution, to cause a service request to be relayed from a network function (NF) client toward a NF server and to receive a service response including an error message and an indication of an originator of the error message. The program code portions are also configured to modify the service response to include an additional indication that the service response has been relayed via a network proxy function and to cause the service response, as modified, to be sent to the NF client.

In an example embodiment, an apparatus is provided that includes means for causing a service request for a network function server to be transmitted via at least one network proxy function and means for receiving a service response comprising at least an error message. The apparatus also includes means for determining from the service response, an originator of the error message and means for differently responding to the error message depending upon the originator of the error message.

The originator of the error message may be at least one of the network function server, a service communication proxy (SCP), a security edge protection proxy (SEPP), or any other network proxy function. In an instance in which the originator of the error message is the at least one network proxy function, the means for responding differently comprises means for causing the service request to be transmitted to the network function server via a different network proxy function. In an instance in which the originator of the error message is a SEPP, the means for responding differently comprise means for causing the service request to be transmitted to a network function server via a different SEPP. In an instance in which the originator of the error message is the network function server, the means for responding differently comprise means for causing the service request to be transmitted to a different network function server using the same or different network proxy function.

In an example embodiment, the service response includes a header that includes an indication as to the originator of the error message or a header than includes an indication that the service response has been relayed by a network proxy function. In this regard, the service response may include an HTTP Via header that includes at least the indication of the type or the identity of the network proxy function relaying the service response, or an HTTP Server header that includes the type or the identity of the originator of the error message. In this example embodiment, the means for determining from the service response the originator of the error message comprise means for determining that the originator of the error message is not the network proxy function that provided the service response in an instance in which the Via header indicates that the network proxy function forwarded the error message or in an instance in which the HTTP Server header identifies the network function server as the originator of the error message. The identity of the originator of the error message may include a fully qualify domain name (FQDN) or an NF instance identifier. The identity of the network proxy function relaying the service response is a fully qualify domain name (FQDN). In an example embodiment, the header consists of a custom header including the indication of the originator of the error message or the indication that the service response has been relayed by a network proxy function.

In another example embodiment, an apparatus is provided that comprises means for causing a service request for a network function server to be transmitted via at least one network proxy function and means for receiving a service response comprising at least an error message. The apparatus also includes means for determining from the service response that the network proxy function was an originator of the error message and means for identifying another network proxy function to which the service request is to be redirected based on an identification of the another network proxy function with the error message. The apparatus further includes means for redirecting the service request for the network function server via the another network proxy function.

In an example embodiment, the means for determining from the service response that the network proxy function was the originator of the error message comprises means for identifying an SCP_REDIRECTION protocol error in the error message. In this example embodiment, the means for identifying another network proxy function to which the service request is to be redirected includes means for identifying another network proxy function to which the service request is to be redirected based upon an identity of the another network proxy function included within a problem detail of the error message. In another example embodiment, the means for determining from the service response that the network proxy function was the originator of the error message comprises means for determining that the service response includes a Server header identifying the network proxy function. In this example embodiment, the means for identifying another network proxy function to which the service request is to be redirected includes means for identifying another network proxy function to which the service request is to be redirected based upon an identity of the another network proxy function included within a Location header of the service response.

In a further example embodiment, an apparatus is provided that comprises means for receiving a service request from a network function client and means for determining that an error condition exists relative to processing of the service request. The apparatus also comprises means for identifying an error message in relation to the error condition and means for causing a service response to be transmitted to the network function service consumer. The service response comprises at least the error message.

The service response may comprise a header that includes the indication as to the originator of the error message. In this regard, the service response may comprise an HTTP Server header that includes the type or the identity of the originator of the error message. The identity of the originator of the error message may a fully qualify domain name (FQDN) or a NF instance identifier. In an example embodiment, the header consists of a custom header including the indication of the originator of the error message.

In yet another example embodiment, an apparatus is provided comprising means for causing a service request to be relayed from a network function (NF) client toward a NF server and means for receiving a service response including an error message and an indication of an originator of the error message. The apparatus also comprises means for modifying the service response to include an additional indication that the service response has been relayed via a network proxy function and means for causing the service response, as modified, to be sent to the NF client.

Various other aspects are also described in the following detailed description and in the attached claims.

BRIEF DESCRIPTION OF THE DRAWINGS

Figure 1:
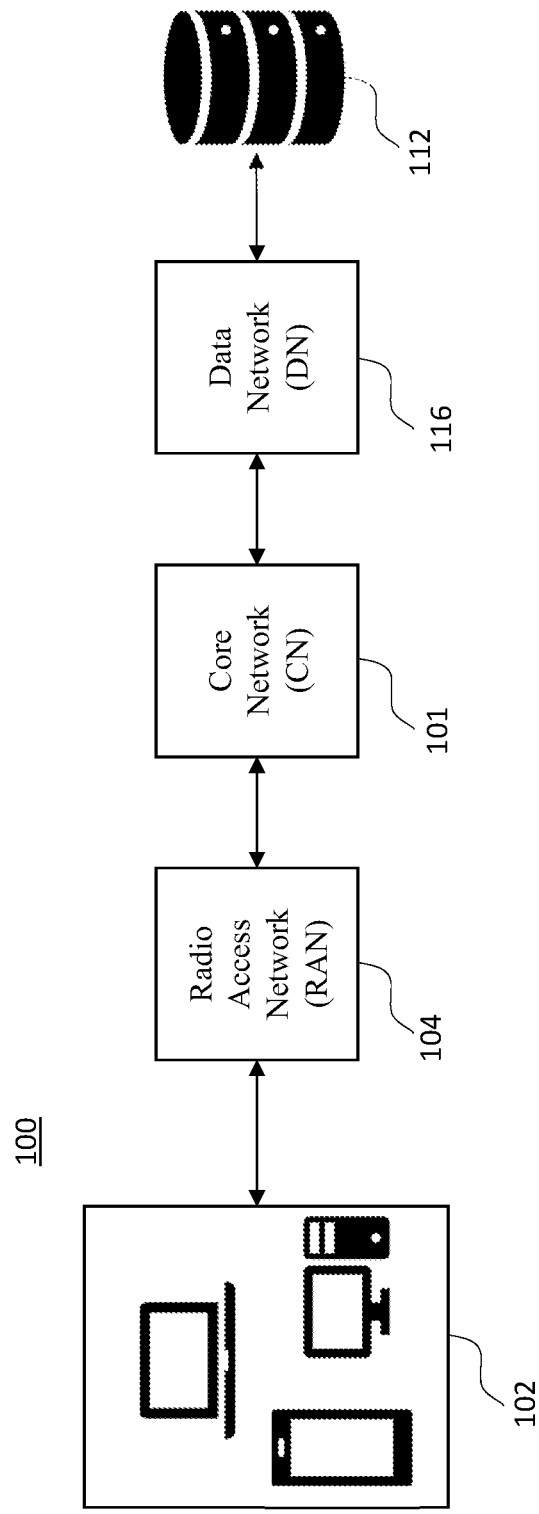
Figure 2:
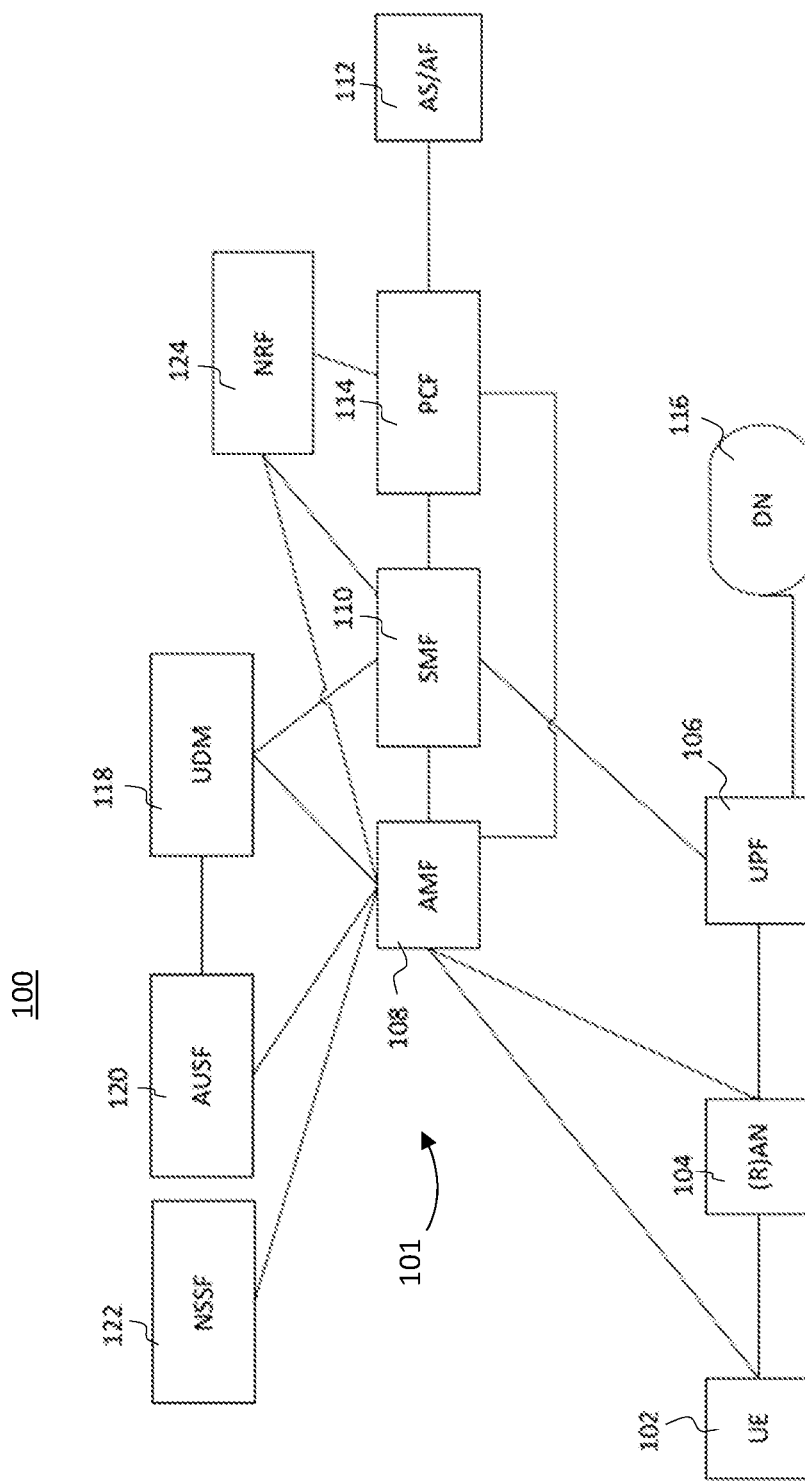
Figure 3:
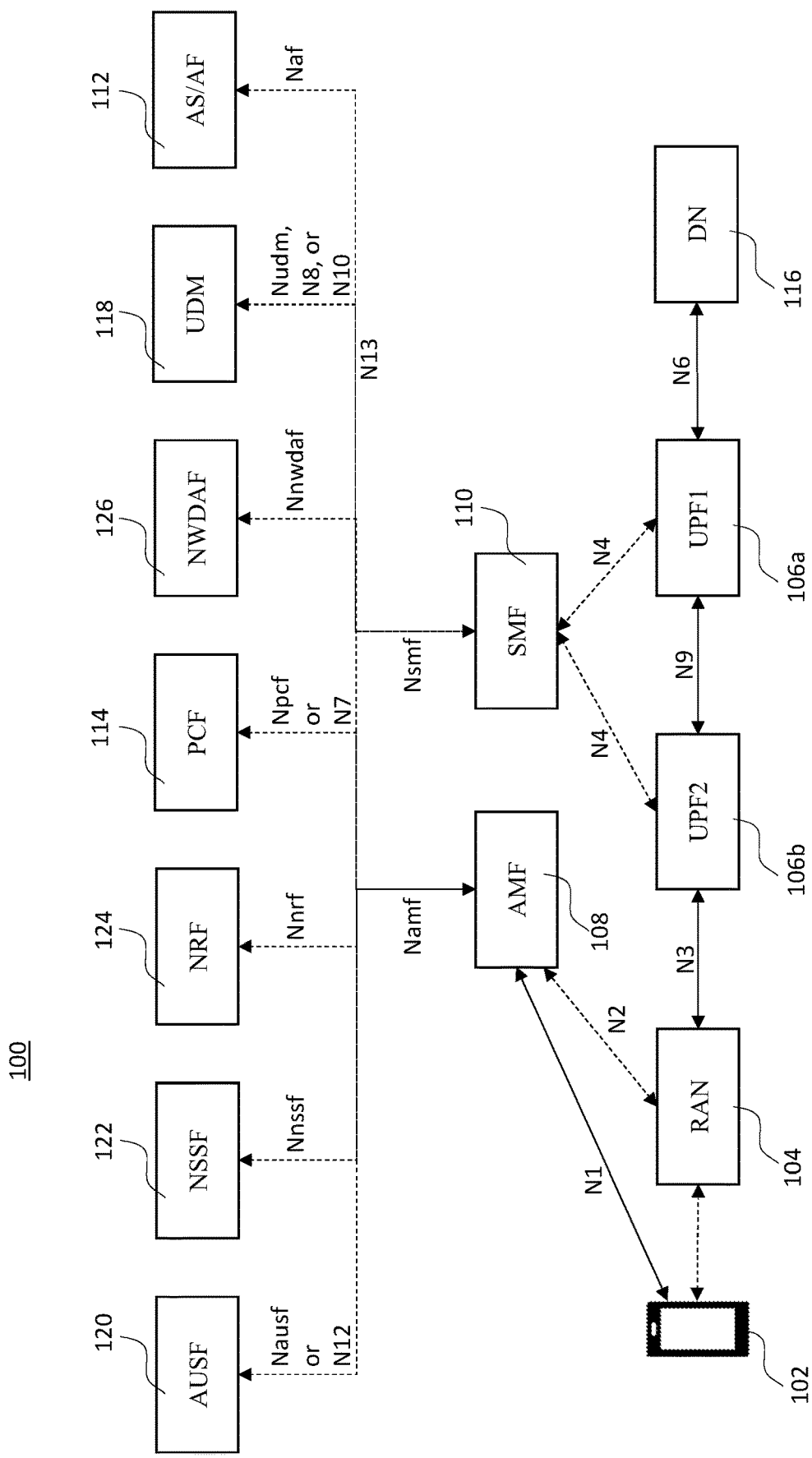
Figure 4:
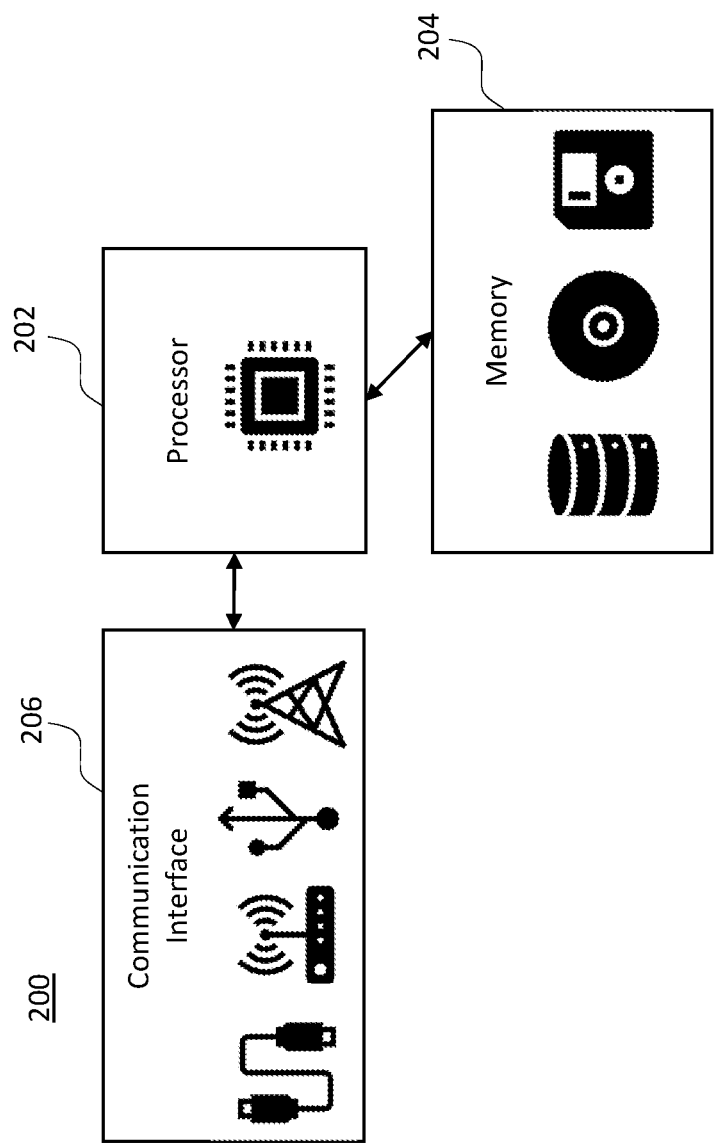
Figure 5:
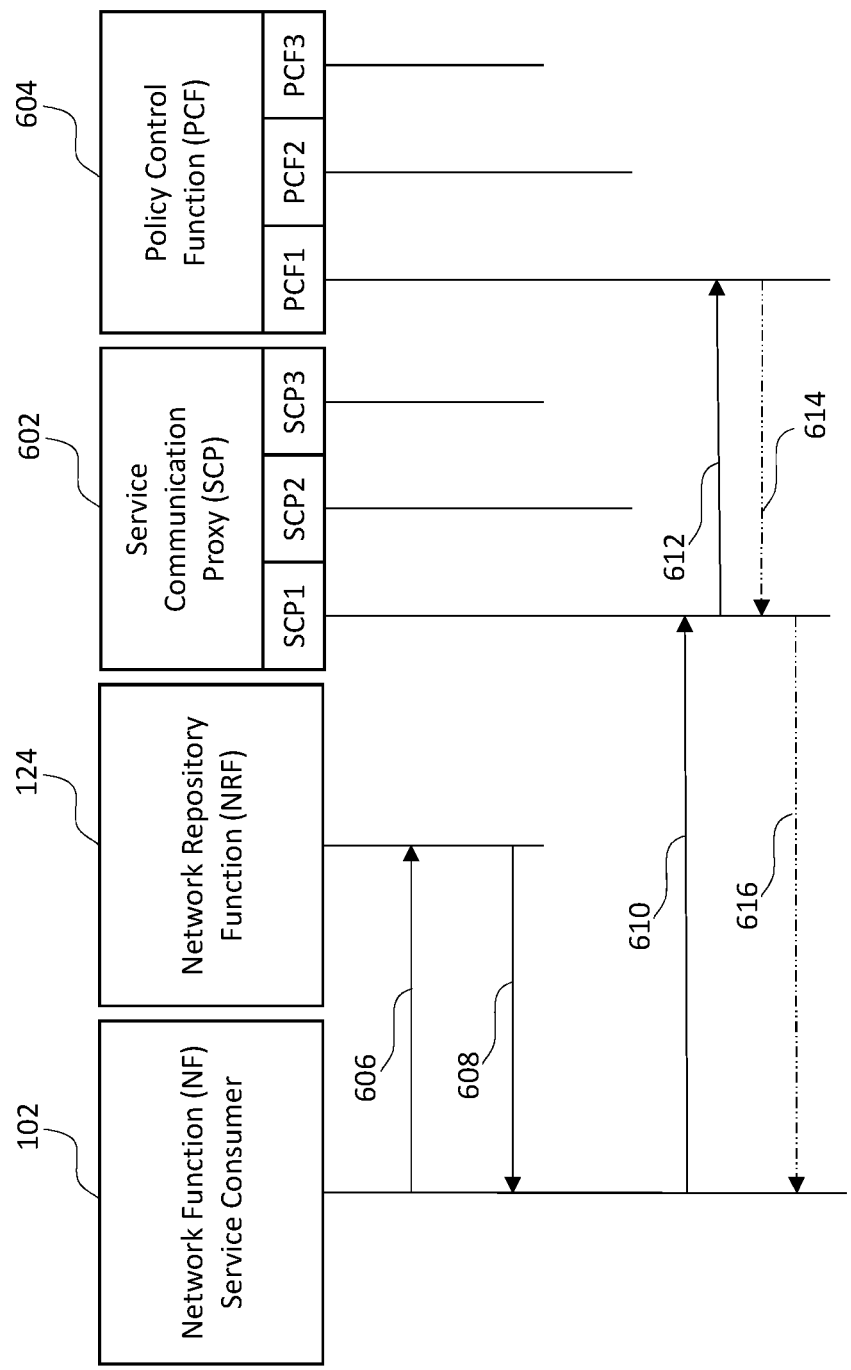
Figure 6:
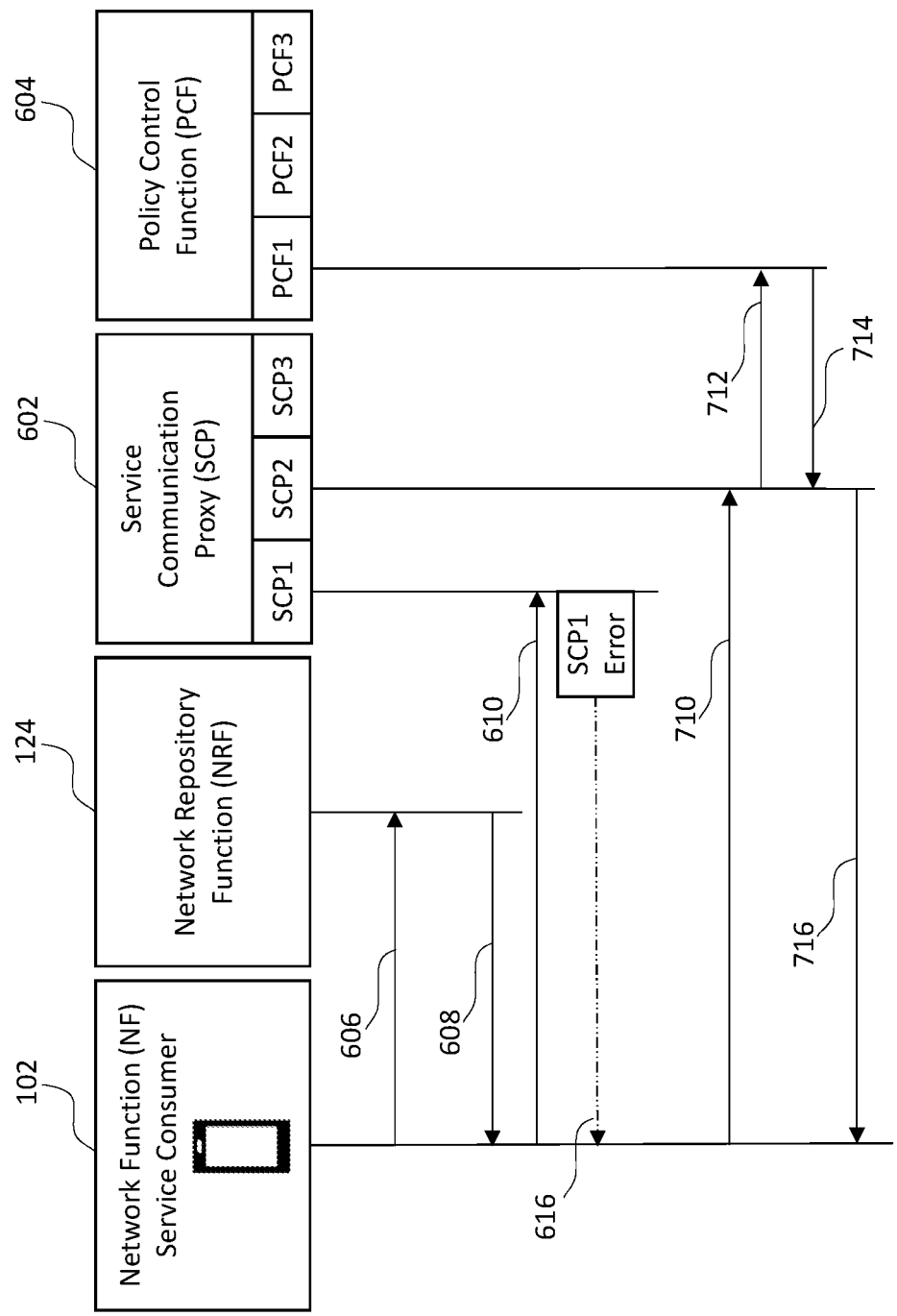
Figure 7:
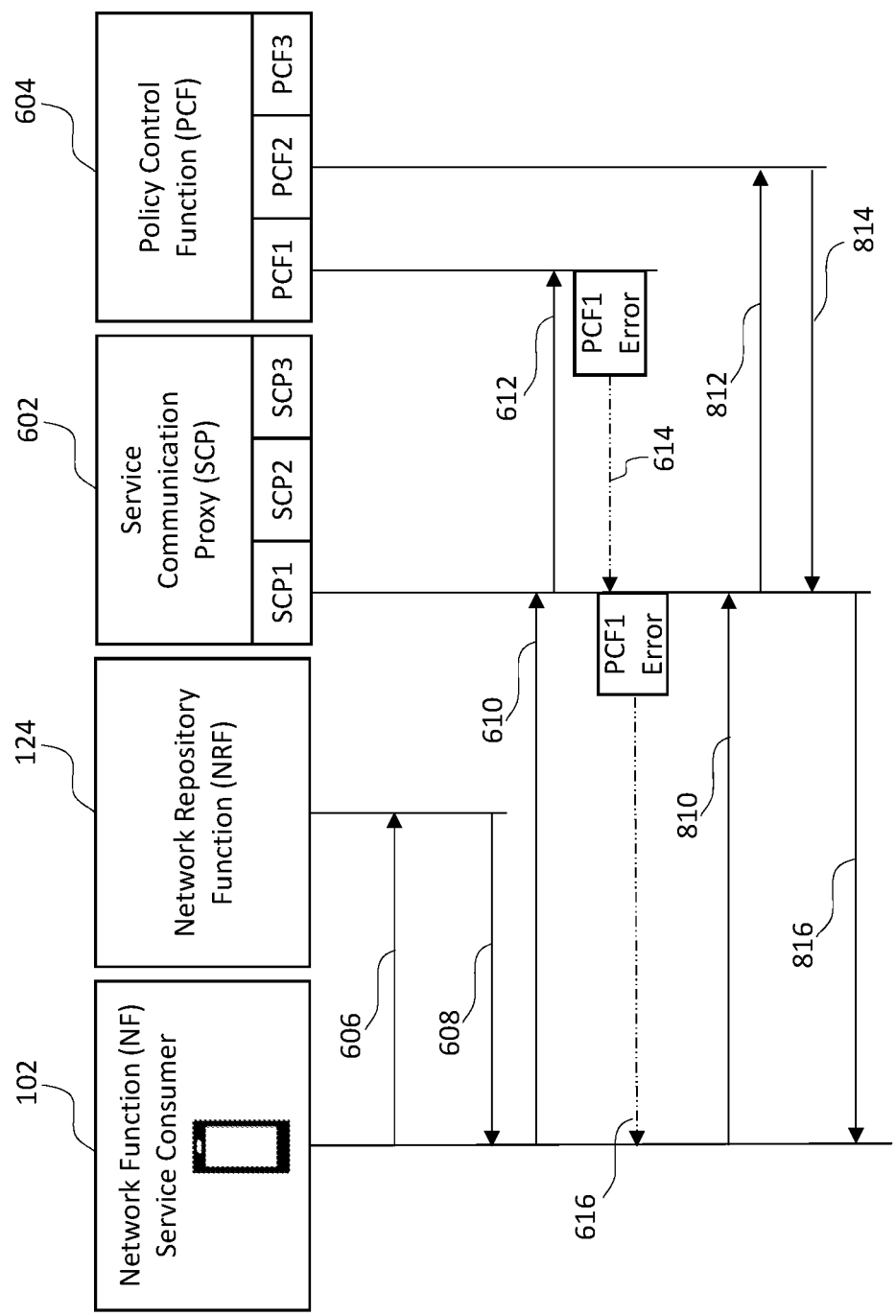
Figure 8:
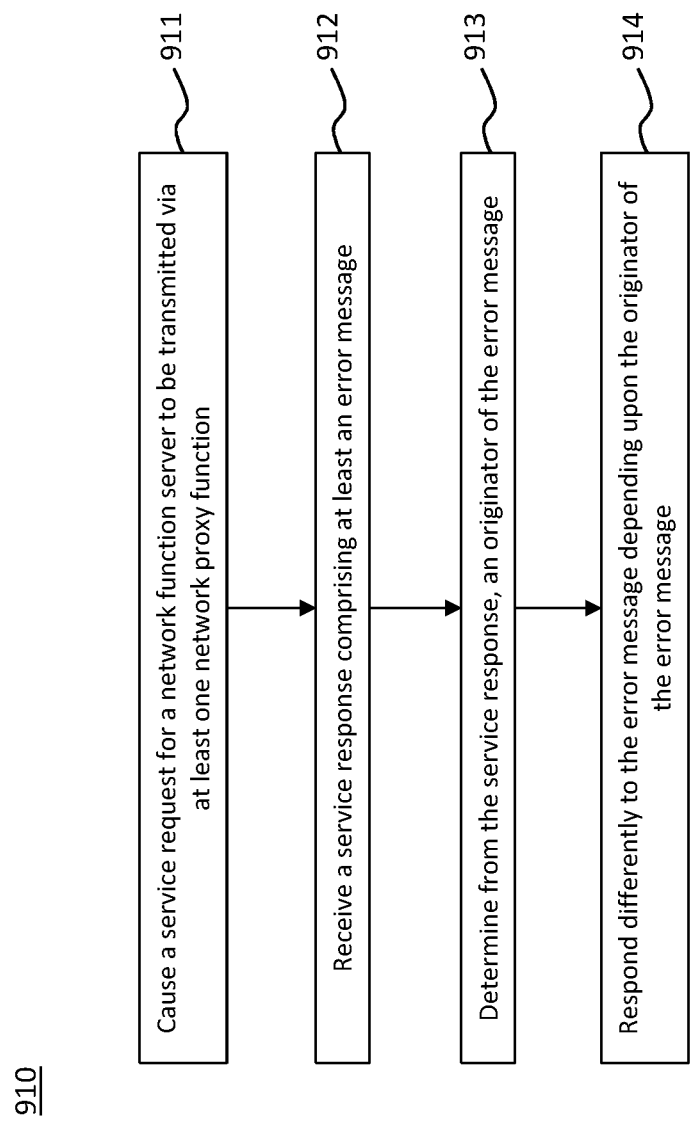
Figure 9:
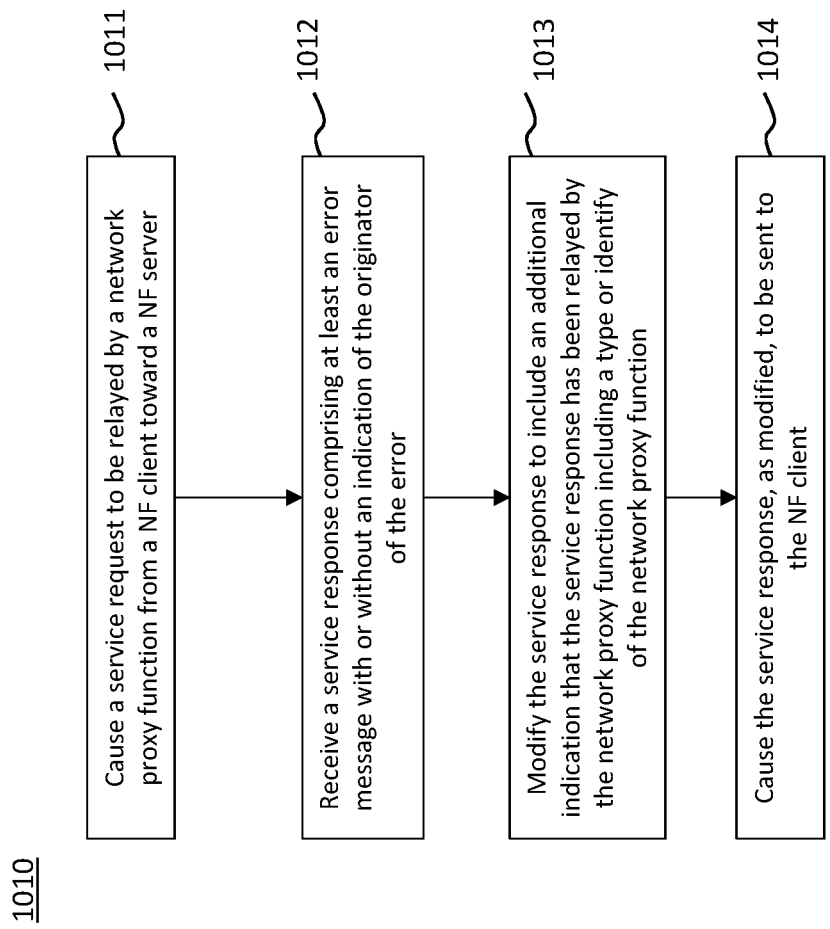
Figure 10:
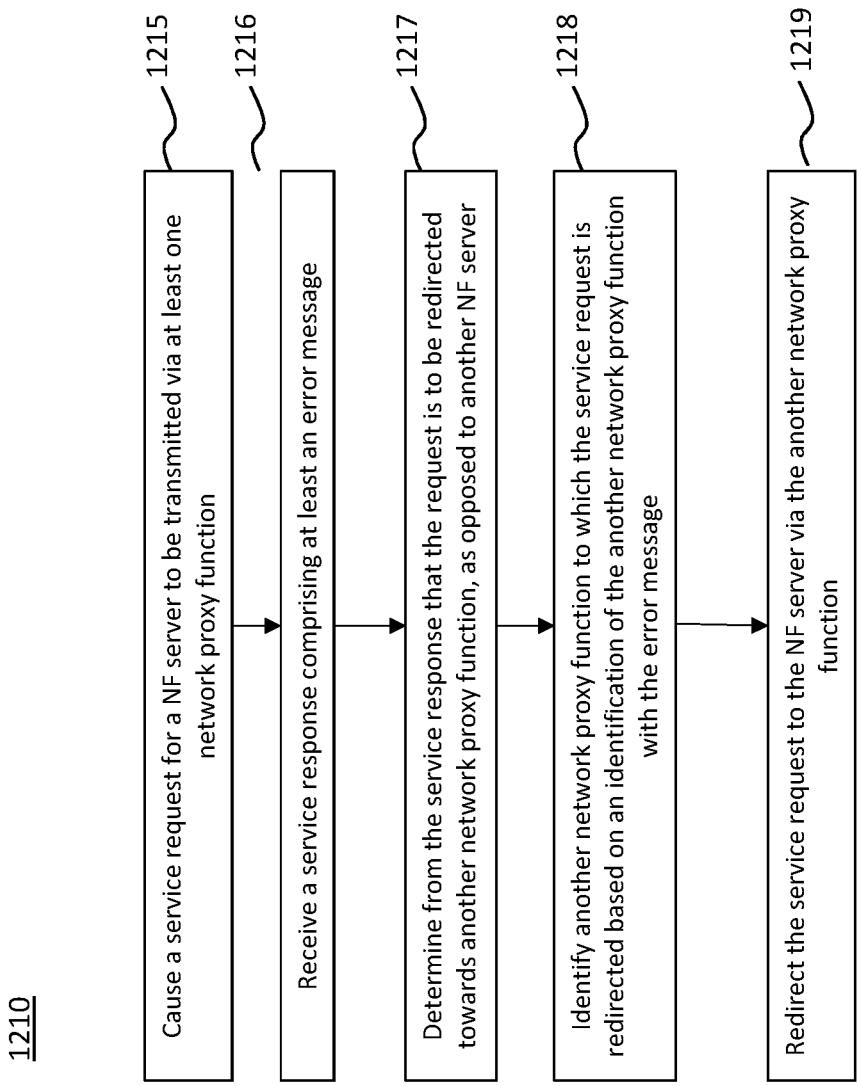
Figure 11:
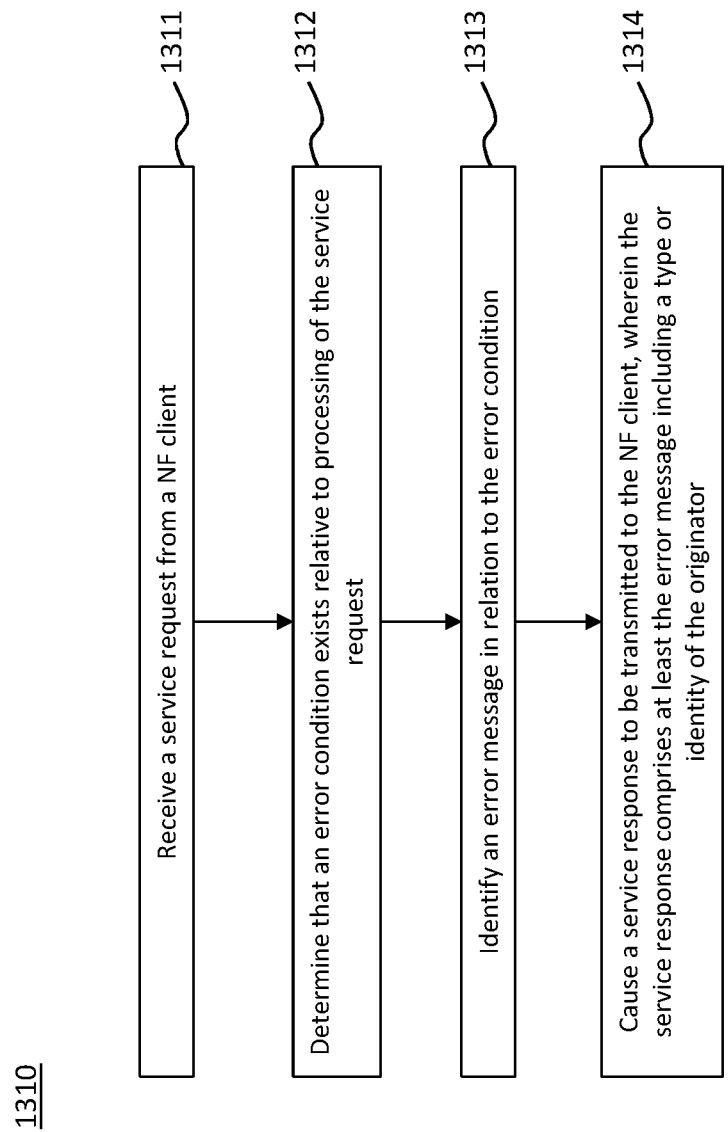

Having thus described embodiments of the disclosure in general terms, reference will now be made to the accompanying drawings, which are not necessarily drawn to scale, and wherein:

FIG. 1 illustrates an example architecture for a communications network, according to some embodiments;

FIG. 2 illustrates an example architecture for a communications network, according to some embodiments;

FIG. 3 illustrates an example architecture for a communications network, according to some embodiments;

FIG. 4 illustrates an example computing device for communicating over communication networks with other network entities, according to some embodiments;

FIG. 5 is a signal flow diagram illustrating a failed communication request between a NF service consumer and PCF, via an intermediate SCP, with an unknown error origin;

FIG. 6 is a signal flow diagram illustrating a failed communication request between a NF service consumer and PCF, via an intermediate SCP, with a known error originator (at the intermediate SCP) and a successfully retransmitted communication request via a different SCP;

FIG. 7 is a signal flow diagram illustrating a failed communication request between a NF service consumer and PCF, via an intermediate SCP, with a known error originator (at the PCF) and a successfully retransmitted communication request via the same SCP towards a different PCF;

FIG. 8 is a flow chart illustrating the operations performed, such as by a NF service consumer or other client device, in accordance with an example embodiment;

FIG. 9 is a flow chart illustrating the operations performed, such as by a SCP or other intermediate entity, in accordance with another example embodiment;

FIG. 10 is a flow chart illustrating the operations performed, such as by a NF service consumer or other client device or by a SCP or other intermediate entity, in accordance with an example embodiment; and FIG. 11 is a flow chart illustrating the operations performed, such as by a NF server, in accordance with an example embodiment.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "mediary," "go-between," and similar terms can be used interchangeably to refer to computers connected via, or programs running on, a network or plurality of networks capable of data creation, modification, deletion, transmission, receipt, and/or storage in accordance with embodiments of the present invention. Thus, use of any such terms should not be taken to limit the spirit and scope of embodiments of the present invention.

Some embodiments herein make specific reference to hypertext transfer protocol (HTTP), however, the present disclosure contemplates that alternative protocols can be used. For example, some alternative protocols are hypertext transfer protocol secure (HTTPS), HTTP/2, HTTP/3, quick user datagram protocol internet connection (QUIC), software package data exchange (SPDY), Gopher protocol, file transfer protocol (FTP), secure copy protocol (SCP), internet application protocol (IAP), and similarly known technologies understood by one skilled in the art in light of the present disclosure. The present disclosure further contemplates that the methods, apparatuses, and computer program products described herein can also be applicable for use with a variety of network standards and communication protocols including those that have been developed and those which have yet to be developed.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

In the following, certain embodiments are explained with reference to communication devices capable of communication via a wired and/or wireless network and communication systems serving such communication devices. Before explaining in detail the exemplifying embodiments, certain general principles of a wired and/or wireless communication system, access systems thereof, and communication devices are briefly explained with reference to FIGS. 1-3 to assist in understanding the technology underlying the described examples.

According to some embodiments, a communication device or terminal can be provided for wireless access via cells, base stations, access points or the like (e.g., wireless transmitter and/or receiver nodes providing access points for a radio access communication system and/or other forms of wired and/or wireless networks). Such wired and/or wireless networks include, but are not limited to, networks configured to conform to 2G, 3G, 4G, LTE, 5G, and any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface. Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2, an S1, and/or the like interface. This interface can be used for example for coordination of operation of the stations and performing reselection or handover operations. The logical communication connection between the initial communication node (e.g., the consumer device or NF service consumer) and the final communication node on the network (e.g., the NF service producer) can comprise a plurality of intermediary nodes (e.g., SCP or SEPP). Additionally, any of the nodes (e.g., initial, final, intermediary) can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or some combination thereof. For example, the device can be a handheld data processing device equipped with radio receiver, data processing and user interface apparatus. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, universal serial bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device (or user equipment UE). A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage and other relevant control apparatus can be provided on an appropriate circuit board and/or in chipsets. Data processing and memory functions provided by the control apparatus of the communication device are configured to cause control and signaling operations in accordance with certain embodiments as described later in this description. A user can control the operation of the communication device by means of a suitable user interface such as touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via appropriate apparatus for receiving and transmitting signals. In some embodiments, a radio unit can be connected to the control apparatus of the device. The radio unit can comprise a radio part and associated antenna arrangement. The antenna arrangement can be arranged internally or externally to the communication device.

In some embodiments, reference is made the following abbreviations: 5G Core Network (5GC), Network Function (NF), Network Repository Function (NRF), Policy Control Function (PCF), Public Land Mobile Network (PLMN), Service Based Architecture (SBA), Service Based Interface (SBI), Service Communication Proxy (SCP), Security Edge Protection Proxy (SEPP), and Session Management Function (SMF).

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a user equipment 102 (UE 102) and a data network 116 (DN 116) via a core network 101 (CN 101) of the communications network 100. The UE 102 can be associated with one or more devices associated with one or more NF service consumers. As illustrated in FIG. 1, a communications network 100 can be provided in which the UE 102 is in operable communication with the RAN 104, such as by way of a transmission tower, a base station, an access point, a network node, and/or the like. In some embodiments, the RAN 104 can communicate with the CN 101 or a component or entity thereof. In some embodiments, the CN 101 can facilitate communication between the UE 102 and the DN 116, such as for sending data, messages, requests, and/or the like. In some embodiments, the DN 116 or the CN 101 can be in communication with an application server or application function 112 (AS/AF 112). The RAN 104, CN 101, DN 116, and/or AS/AF 112 can be associated with an NRF, NF service producer, SCP, SEPP, PCF, the like, or any combination thereof.

In the context of a fifth-generation (5G) network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the RAN 104, which can then relay the communications between the UE 102 and the CN 101, the CN 101 being connected to the DN 116, which can be in communication with one or more AS/AF 112. In some embodiments, the UE 102 can be in communication with a radio access network 104 (RAN 104), which can act as a relay between the UE 102 and other components or services of the CN 101. For instance, in some embodiments, the UE 102 can communicate with the RAN 104, which can in turn communicate with an Access and Mobility Management Function 108 (AMF 108). In other instance or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 can be in communication with one or more User Plane Functions 106 (UPF 106, UPF 106a, UPF 106b, collectively "UPF 106"). By way of example only, in some embodiments, the UPF 106 can be in communication with the RAN 104 and the DN 116. In other embodiments, the DN 116 can be in communication with a first UPF 106a and the RAN 104 can be in communication with a second UPF 106b, while the SMF 110 is in communication with both the first and second UPFs 106a, b and the first and second UPFs 106a, b are in communication each with the other.

In some embodiments, the UE 102 can comprise a single-mode or a dual-mode device such that the UE 102 can be connected to one or more RANs 104. In some embodiments, the RAN 104 can be configured to implement one or more radio access technologies (RATs), such as Bluetooth, Wi-Fi, and GSM, UMTS, LTE or 5G NR, among others, that can be used to connect the UE 102 to the CN 101. In some embodiments, the RAN 104 can comprise or be implemented using a chip, such as a silicon chip, in the UE 102 that can be paired with or otherwise recognized by a similar chip in the CN 101, such that the RAN 104 can establish a connection or line of communication between the UE 102 and the CN 101 by identifying and pairing the chip within the UE 102 with the chip within the CN 101. In some embodiments, the RAN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive multiple input and multiple output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, WIFI-cellular convergence, non-orthogonal multiple access (NOMA), channel coding, and the like.

As illustrated in FIG. 3, the UE 102 can be configured to communicate with the RAN 104 in a N1 interface, e.g., according to a non-access stratum (NAS) protocol. In some embodiments, RAN 104 can be configured to communicate with the CN 101 or a component thereof (e.g., the AMF 108) in a N2 interface, e.g., in a control plane between a base station of the RAN 104 and the AMF 108. In some embodiments, the RAN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in a Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a fifth-generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices, and computer program products described herein are described within the context of a fifth-generation core network (5GC) and system, such as illustrated in FIGS. 1-3 and described hereinabove, the described methods, devices, and computer program products can nevertheless be applied in a broader context within any suitable telecommunications system, network, standard, and/or protocol.

Turning now to FIG. 4, examples of an apparatus, such as a core network apparatus (CNA) (including, for example, one or more of the core network services: UPF 106, AMF 108, SMF 110, PCF 114, and/or another NF and/or NRF), can be embodied by a NF service consumer or other NF client, a SCP or other intermediate entity or a NF service producer or other NF server as configured in accordance with an example embodiment of the present disclosure. As described below in conjunction with the flowcharts of FIGS. 8, 9, 12 and 13, the apparatus 200 of an example embodiment can be configured to perform the functions described herein. In any instance, the apparatus 200 can more generally be embodied by a computing device, such as a server, a personal computer, a computer workstation or other type of computing device including those functioning as a user equipment and/or a component of a wireless local area network. Regardless of the manner in which the apparatus 200 is embodied, the apparatus of an example embodiment can be configured as shown in FIG. 4 so as to include, be associated with or otherwise be in communication with a processor 202 and a memory device 204 and, in some embodiments, and/or a communication interface 206. In some embodiments, the UE 102, a SCP, an access point or base station including a NF Service Consumer, e.g., SMG, and/or a NF Service Producer or other elements of the system 100 can be embodied by an apparatus 200 as shown in FIG. 4.

The processor 202 (and/or co-processors or any other circuitry assisting or otherwise associated with the processor) can be in communication with the memory device 204 via a bus for passing information among components of the apparatus 200. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 200 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment of the present invention on a single chip or as a single "system on a chip." As such, in some cases, a chip or chipset can constitute means for performing one or more operations for providing the functionalities described herein.

The processor 202 can be embodied in a number of different ways. For example, the processor can be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 202 can be configured to execute instructions stored in the memory device 204 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as an ASIC, FPGA or the like, the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present invention by further configuration of the processor by instructions for performing the algorithms and/or operations described herein. The processor can include, among other things, a clock, an arithmetic logic unit (ALU) and logic gates configured to support operation of the processor.

In embodiments that include a communication interface 206, the communication interface can be any means such as a device or circuitry embodied in either hardware or a combination of hardware and software that is configured to receive and/or transmit data from/to a network and/or any other device or module in communication with the apparatus 200, such as NF, NRF, a base station, an access point, SCP, UE 102, radio access network, core network services, an application server/function, a database or other storage device, etc. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication. As such, for example, the communication interface can include a communication modem and/or other hardware/software for supporting communication via cable, digital subscriber line (DSL), universal serial bus (USB) or other mechanisms. In some embodiments, a session management function can comprise a 5GC session management function for any suitable control and user plane separation (CUPS) architecture, such as for the gateway GPRS support node (GGSN-C), TWAG-C, BNG-CUPS, N4, Sxa, Sxb, Sxc, evolved packet core (EPC) SWG-C, EPC PGW-C, EPC TDF-C, and/or the like.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 can be configured to control the functioning of the transmitter and receiver by effecting control signaling via electrical leads to the transmitter and receiver. Likewise, the processor 202 can be configured to control other elements of apparatus 200 by effecting control signaling via electrical leads connecting the processor 202 to the other elements, such as a display or the memory 204.

The apparatus 200 can be capable of operating with one or more air interface standards, communication protocols, modulation types, access types, and/or the like. Signals sent and received by the processor 202 can include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals can include speech data, user generated data, user requested data, and/or the like.

For example, the apparatus 200 and/or a cellular modem therein can be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 200 can be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 200 can be capable of operating in accordance with 2.5G wireless communication protocols General Packet Radio Service (GPRS), Enhanced Data GSM Environment (EDGE), and/or the like. Further, for example, the apparatus 200 can be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The NA 200 can be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 200 can be capable of operating in accordance with 4G wireless communication protocols, such as LTE Advanced, 5G, and/or the like as well as similar wireless communication protocols that can be subsequently developed. In some embodiments, the apparatus 200 can be capable of operating according to or within the framework of any suitable CUPS architecture, such as for the gateway GPRS support node (GGSN-C), trusted wireless access gateway (TWAG-C), broadband network gateways (BNGs), N4, Sxa, Sxb, Sxc, evolved packet core (EPC) SWG-C, EPC PGW-C, EPC TDF-C, and/or the like.

Some of the embodiments disclosed herein can be implemented in software, hardware, application logic, or a combination of software, hardware, and application logic. The software, application logic, and/or hardware can reside on memory 204, the processor 202, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4, computer-readable medium can comprise a non-transitory computer-readable storage medium that can be any media that can contain or store the instructions for use by or in connection with an instruction execution system, apparatus, or device, such as a computer.

FIG. 5 illustrates a signal flow between a plurality of network entities and demonstrates the issue addressed by the present disclosure. In FIG. 5, an NF client in the form of a network function (NF) service consumer 102 generates a service request in the form of a network repository function (NRF) discovery request 606 for an NF server in the form of a policy control function (PCF) 604. In response, the NRF 124 transmits an NRF discovery response 608 to the NF service consumer 102. The NRF discovery response 608 comprises information for one or more PCF 604 profiles that correspond to the NF service consumer's 102 network repository function (NRF) discovery request 606. The PCF 604 profiles can include at least one of an IP address, FQDN, capacity information, priority information or the like, or any combination thereof. Upon receipt of the NRF discovery request 606, the NF service consumer 102 of this example selects PCF1 and generates an HTTP POST request and transmits the HTTP request 610 with the selected PCF profile to a service communication proxy (SCP). As illustrated in FIG. 5, the first SCP1 receives the HTTP request 610 and transmits a message 612 to the selected PCF1. PCF1 transmits an error message communication 614 to SCP1 and SCP1 transmits the error message communication 616 to the NF service consumer 102. The error message communications 614, 616 can comprise any HTTP error code (e.g., 503, 429, etc.) or similar protocol error identification details. The reasons for the HTTP, or other protocol, error can be any failure including rejection due to overload. The NF service consumer 102, in the illustrated communication scenario depicted in FIG. 5, is not provided with the originator of the communication error. Without knowing the source of the error, the NF service consumer 102 is uninformed as to how to route or redirect the request (and possibly further subsequent requests) so as to successfully establish communications with PCF1. In the indirect communication scenario, illustrated by FIG. 5, between, for example, a 5GC NF service consumer 102 by way of a SCP 602, or another intermediate entity (e.g., security edge protection proxy (SEPP) for inter-PLMN communications), the source of the error cannot be determined as a result of the plurality of entities that serve to relay the message between the NF service consumer and PCF1. In this regard, the error can occur at any node that receives and/or transmits the message (e.g., SCP 602, PCF 604, NF service consumer 102, etc.). Without the identification of the originator of the error, the NF service consumer 102 or other client device, e.g., the HTTP client, cannot adapt the communication request based on the actual error to retransmit a request or send subsequent requests. Additionally, the peer selection policy of the NF service consumer 102 does not work correctly without the identification of the originator of the error. Additionally, lacking information about the originator of the error also creates inefficiencies for trouble-shooting and debugging of the HTTP request 610 and the source of the error.

The present disclosure contemplates that the communication error can occur at any node in the logical communication flow. In this regard, a request from an NF client, e.g., NF service consumer, or other client device, e.g., an HTTP client, may traverse one or more network proxy functions, e.g., SCPs, SEPPs or other intermediate entities and optionally SCPs for inter-PLMN signaling, and may fail at a SCP, SEPP, NRF or HTTP server. In accordance with an example embodiment, the entity that is the source of the error, such as a SCP, SEPP, or another intermediate network entity as well as the NF server, such as a NF Service Producer, e.g., PCF1, may be the source of an error (e.g., 400 Bad Request, etc.). In addition, a SCP, SEPP, or another intermediate network entity is also configured to forward error messages received from other, e.g., upstream, entities (e.g., SCP, SEPP, HTTP server, NRF, etc.). In an instance in which the NF client, e.g., a NF service consumer, or other client device, e.g., HTTP client, is informed of the originator of the error, the NF client or other client device, e.g., the HTTP client, is configured to adjust its behavior over the network to successfully retransmit communication requests or send subsequent service requests (e.g., request a redirection for an alternative SCP in an instance a 429 error is generated by the current SCP or request a redirection for an alternative PCF in an instance a 429 error is generated by the current PCF) to increase the likelihood that the request is successfully received by the NF server. In an example embodiment, the originator of the error cannot be determined based upon the presence or absence of a ProblemDetails structure in an HTTP response, because a NF server, e.g., NF service producer, and/or an intermediate entity, such as a SCP, can return error messages with or without a ProblemDetails structure.

By way of example, FIG. 6 illustrates a call flow between a plurality of network entities where the communication error originates at SCP1. As illustrated, in FIG. 6, the network function (NF) service consumer 102 generates a network repository function (NRF) discovery request 606 for a policy control function (PCF) 604. In response, the NRF 124 transmits an NRF discovery response 608 to the NF service consumer 102. The NRF discovery response 608 comprises information for one or more PCF 604 profiles that correspond to the NF service consumer's 102 network repository function (NRF) discovery request 606. The PCF 604 profiles can include at least one of an IP address, FQDN, capacity information, priority information or the like, or any combination thereof. Upon receipt of the NRF discovery request 606, the NF service consumer 102 selects PCF1 and generates an HTTP POST request and transmits the HTTP request 610 with the selected PCF1 profile information to SCP1. The SCP1 receives the HTTP request 610 and encounters an error. In response to the error, SCP1 generates an error message 616 with an HTTP standard header (e.g., server) and inserts an identification of the originator of the error in the message that is returned, such as in the header. In some embodiments, example error origination data inserted in the message header includes, at least, Server: scp-scp1.com, Server: scp, Server: sepp-sepp1.operator.com, Server: nrf-xyz, or Server: udm. The generated error message 616 with the error information identified in the HTTP header is transmitted to NF service consumer 102. Based on the identified originator of the communication error in received error message 616, the NF service consumer is configured to generate a new HTTP request 710 with communication instructions identifying another SCP other than SCP1 (e.g., SCP2). The NF service consumer transmits the new HTTP request 710 to SCP2. SCP2 receives the new HTTP request 710 and transmits a corresponding message 712 to the selected PCF1. PCF1 receives the communication 712. PCF1 transmits a reply message 714 to SCP2 and SCP2 transmits a message 716 to NF service consumer 102, thereby successfully transmitting the message to and receiving the reply from PCF1.

As another example, FIG. 7 illustrates a signal flow between a plurality of network entities where the communication error originates at PCF1. As illustrated in FIG. 7, the network function (NF) service consumer 102 generates a network repository function (NRF) discovery request 606 for a policy control function (PCF) 604. In response, the NRF 124 transmits an NRF discovery response 608 to the NF service consumer 102. The NRF discovery response 608 comprises information for one or more PCF 604 profiles that correspond to the NF service consumer's 102 network repository function (NRF) discovery request 606. The PCF 604 profiles can include at least one of an IP address, FQDN, capacity information, priority information or the like, or any combination thereof. Upon receipt of the NRF discovery request 606, the NF service consumer 102 selects PCF1 and generates an HTTP POST request and transmits the HTTP request 610 with the selected PCF1 profile information to SCP1. The SCP1 receives the HTTP request 610 and transmits a communication 612 to PCF1. PCF1 receives the communication 612 from SCP1 and encounters an error. In response to the error, PCF1 generates an error message 614 with an HTTP header (e.g., a Server header) and inserts the identification of the originator of the error in the header (e.g., PCF1). In some embodiments, example error origination data inserted in the message header includes, at least, Server: pcf-pcf1.com, Server: pcf, Server: pcf-pcf1.operator.com, Server: nrf-pcf, or Server: udm. The generated error message 614 with the error information identified in the HTTP header is transmitted to SCP1 and SCP1 inserts additional transmission information into the HTTP header (e.g., a Via header) of the error message and transmits the corresponding error message 616 with the identified originator of the error to NF service consumer 102. Based on the identified PCF1 originator of the communication error in the received error message 616, the NF service consumer generates a new HTTP request 810 with communication redirection instructions identifying another PCF 604 other than PCF1 (e.g., PCF2). The NF service consumer transmits the new HTTP request 810 to SCP1. SCP1 receives the new HTTP request 710 and transmits a corresponding message 812 to the selected PCF2. PCF2 receives the message 812. PCF2 transmits a reply 814 to SCP1 and SCP1 transmits a corresponding message 816 to NF service consumer 102, thereby successfully transmitting the message to and receiving the reply from PCF2.

Referring now to FIG. 8, a flowchart of the operations of a method 910 performed by an apparatus 200 embodied by the originator of the service request, such as an NF client, e.g., NF Service Consumer, a client device, an NF Service Producer, e.g., an HTTP client, or the like, in accordance with an example embodiment is depicted. As shown in block 911, the apparatus 200 includes means, such as the processor 202, the communication interface 206 or the like, to cause a service request for a network function server to be transmitted via a network proxy function, such as a SCP or SEPP, to or toward the destination, such as the NF server, e.g., NF Service Producer or NF Service Consumer. As shown in block 912, the apparatus 200 includes means, such as the processor 202, the communication interface 206 or the like, to receive a service response comprising at least an error message. As shown in block 913, the apparatus 200 includes means, such as the processor 202 or the like, to determine from the service response, an originator of the error message. As shown in block 914, the apparatus 200 includes means, such as the processor 202, the communication interface 206 or the like, to respond differently to the error message depending upon the originator of the error message.

For example, the NF server may need to direct the service request to another NF server, e.g. due to overload or because it is going to shut down. In this instance, the service request may be directed to a different NF server. Alternatively, a SCP may not be able to process the service request or may wish to direct the service request to another SCP, e.g. due to overload or because it is not the correct SCP to use for the corresponding network slice, or because it is going to shut down. In this case, the service request may be directed to the same NF server via a different SCP. As such, the service request, as now directed, will not encounter the same entity that was the originator of the error in conjunction with the original service request. In some embodiments, the NF client, such as a NF service consumer, NF service producer or other client device, may determine the different network proxy function, e.g., SCP, or different NF server, e.g., NF service producer or NF Service Consumer, to which the service request should be directed and then retransmit the service request or transmit a subsequent service request in such a manner as to avoid the originator of the error message. Alternatively, the determination of the different network proxy function, e.g., SCP, or different NF server, e.g., NF service producer or NF service consumer, may be based on information provided by the network proxy function or the NF server which identifies the different network proxy function, e.g., SCP, or the different NF server, e.g., NF service producer, such as in a Location header as described below or within the payload of the response message (e.g. within problem details information), such that the NF client may redirect the service request to the different network proxy function or the different NF server. While a single service request may be redirected, such as via an HTTP redirection, in some embodiments, the apparatus 200, such as the processor 202, of other embodiments causes a plurality of service requests to be redirected, such as to different SCPs and/or different NF service providers, to increase the likelihood of receiving the expected service response.

As described above, with reference to FIGS. 6 and 7, information is included in the HTTP, or similar protocol, service response to identify the originator of the error. This information is then relayed between nodes of the network as needed to inform the appropriate network communication entities of the originator of the error. Specifically, the information regarding the originator of the error may be included as an error message in a header which can be used by the NF client to determine the originator of the error so that appropriate adaptive behavior can be determined to subsequently circumvent the entity that is the originator of the error. In some embodiments, the error message may be added to a HTTP header, such as by way of a Server header, a Via header, or the like, or a 3GPP Custom header may be created. In this regard, the error message may consist of an HTTP Via header further configured to indicate the type (e.g. "SCP") or the identity (e.g. a Fully Qualified Domain Name) of the network proxy function forwarding the error response, an HTTP Server header further configured to indicate the type (e.g. "PCF", "SCP", "SEPP") or the identity (e.g. a Fully Qualified Domain Name or a NF instance Identity) of the originator of the error, or a new HTTP custom header containing the NF type and/or the identifier of the originator of the error (e.g. SCP FQDN or NF Instance ID), and/or the type (e.g., "SCP") or identifier of the entity forwarding the error message (e.g., FQDN, an NF instance identifier or a network entity identifier).

By way of example, in an instance in which the error message is provided with a Via header identifying a network proxy function that forwarded the service response, the apparatus 200, such as the processor 202, is configured to determine that the originator of the error message is not the network proxy function that provided the service response with the Via header, e.g., the next hop SCP. Instead, the originator of the error message may be identified, for example by the Server header that may identify the network function server or an upstream network proxy function as the originator of the error message.

In relation to a Server header, the Server header may include the type and/or identification of the NF server or network proxy function that is the originator of the error. In one embodiment, the Server header may begin with the value of the type (e.g. "nrf", "scp", "sepp", "udm") followed by a "-" and any other specific information, such as the identification, e.g. FQDN, of the NF server or network proxy function that is the originator of the error. Examples include Server: scp-scp1.com, Server: scp, Server: sepp-sepp1.operator.com, Server: nrf-xyz and Server: udm. In some embodiments, the presence of the Server header in the service response indicates to the NF client that the identified network entity, or entities, as identified by the identification information is/are the originator(s) of the error. In some embodiments, the information contained in the headers, such as the Via and Server headers or the Custom header may be used for troubleshooting, debugging and/or by the NF client to determine the appropriate response logic (e.g., cancel, redirect, retry, etc.). In some embodiments, the NF client may initiate a hold, or cooldown, time prior to retrying to establish communications with the NF server and/or another identified network entity.

While FIG. 8 depicted the operations performed in an example embodiment from the perspective of the originator of the service request, such as a NF client, e.g., NF service consumer, or other client device, e.g., an HTTP client, or the like, FIG. 9 illustrates a flowchart of the operations of a method 1010 performed, in some embodiments, by the apparatus 200 embodied by a network proxy function, e.g., SCP, SEPP or other intermediate entity, in order to facilitate identification of the originator of the error and redirection of a message once the originator of the error is identified. As shown in block 1011, the apparatus 200 includes means, such as the processor 202, the communication interface 206 or the like, to receive a service request, such as originated by a NF client, e.g., NF service consumer, NF service producer, or other client device, e.g., an HTTP client, and to cause the service request to be relayed toward a NF server, e.g., NF service producer or NF service consumer. Block 1012 shows, the apparatus 200 includes means, such as the processor 202, the communication interface 206 or the like, to receive a service response comprising at least an error message with optionally an indication of the originator of the error. The service response is received from the NF server, either directly or via one or more other network proxy functions.

Block 1013 shows the apparatus 200 includes means, such as the processor 202 or the like, to modify the service response to include an additional indication that the service response has been relayed via the network proxy function including the type or identity of the network proxy function. The service response may be modified in various manners. In one embodiment, the service response is modified to include an additional header, e.g., a Via header, that identifies the SCP or SEPP that is relaying the service response to the NF client. For example, a HTTP Via header may be further configured to indicate the type (e.g. "SCP") or the identity (e.g. a Fully Qualified Domain Name) of the network proxy function forwarding the error response. The Via header may be provided in combination with a Server header that may include the error message including the identification of the originator of the error. In this regard, an HTTP Server header may be further configured to indicate the type (e.g. "PCF", "SCP", "SEPP") or the identity (e.g. a Fully Qualified Domain Name or a NF instance Identity) of the originator of the error. The entity, such as the NF server or an upstream network proxy function, that is the originator of the error may have added the error message including its identity as the originator of the error to the header, such as the Server header, of the service response. Alternatively, the entity, such as the NF server or an upstream network proxy function, that is the originator of the error may have included the error message including its identity as the originator of the error in the service response, but not in the header. In this instance, the apparatus 200 as embodied by the SCP may not only add a Via header that includes its identity, but may also include the error message and the identification of the originator of the error to a Server header. In another embodiment, the service response does not include a Via header or a Server header, but is modified to include a different header, such as a Custom header, that includes the identity the SCP that is relaying the service response to the NF client. This additional header, such as a Custom header, may also include the error message including the identification of the originator of the error. In this regard, the apparatus 200 embodied by the SCP may add the error message including the identification of the originator of the error to the Custom header, or the entity, e.g., the NF server, that is the originator of the error may create the Custom header and include the error message including the identification of the originator of the error therewithin and the network proxy function, e.g., SCP, may add its identity to the Custom header as an entity that forwarded the error message. For example, a Custom header may contain the NF type and/or the identifier of the originator of the error (e.g. SCP FQDN or NF Instance ID), and/or the type or identifier of the entity forwarding the error message (e.g. "SCP").

Referring now to block 1014, the apparatus 200 of this example embodiment as embodied by the SCP or other intermediate entity may also include means, such as the processor 202, the communications interface 206 or the like, for causing the service response, as modified, to be sent to the NF client, e.g., NF service consumer, NF service producer or other client device, e.g., an HTTP client. As described above, the service response has been modified to not only include the error message including an identification of the source of the error, but also the identity of the SCP or other intermediate entity that forwarded the service response. As such, the service request may be intelligently retransmitted or a subsequent service request may be sent in such a manner as to intentionally avoid reliance upon the entity that was the originator of the error.

With respect to the headers that may include the identity of the SCP that is relaying the service response to the NF client, aVia header 1110 of an example embodiment may be further configured to define at least the type or identity of the network proxy function, e.g., the SCP or SEPP, relaying the error message as described above with reference to FIG. 9. In some embodiments, the Via header is constructed by the apparatus 200 embodied by the SCP as depicted in FIG. 9, and is inserted into the response to indicate to the NF client, e.g., NF service consumer or other client device, e.g., an HTTP client, that the associated reported error is forwarded by the intermediate SCP and is not an SCP error. The network proxy functions that relay the service response and are identified by the Via header include not only a SCP, but other intermediate entites (e.g., SEPP, etc.). Certain example embodiments of the manner in which the Via header identifies the intermediate SCP can include at least "Via: 2.0 SCP", "Via: 2.0 scp1.com", or the like, or any combination thereof. The service response may include one or more additional headers in addition to the Via header. In some embodiments, for example, the service response provided by the 5GC NFs and other network entities (e.g., SEPP, SCP, PCF, etc.) may also include one or more Server header(s) which may include the error message and identify the originator of the error. In some embodiments, the service response provided by the 5GC NFs and other network entities (e.g., SEPP, SCP, PCF, etc.) may also include one or more other Via header(s) in addition to the Via header constructed by the SCP.

As an alternative to the Via header, the identity of the SCP that is relaying the error message including the originator of the error to the NF client may, instead, be included in a Custom header. The Custom header of one embodiment has a format configured to be applicable to all 5GC Service Based Interfaces. In some embodiments, the Custom header identifies whether the error is originated by an intermediate entity (e.g., a SCP, SEPP, etc.) or by a NF server (e.g., NF service producer, etc.). In some embodiments, a Custom header (e.g., "3GPP-Sbi-SCP-Error: <scp fqdn>"), is used to differentiate errors arising from a SCP from the errors generated by other network entities. In some embodiments, the Custom header contains an identifier (e.g., IP address, etc.) of a network entity that originates an error. In this regard, a Custom header contain the NF type and/or the identifier of the originator of the error (e.g. SCP FQDN or NF Instance ID), and/or the type or identifier of the entity forwarding the error message (e.g. "SCP"). In some embodiments, a Custom header is defined as a "3GPP-Sbi-Error" header, containing the NF type and/or the identifier of the originator of the error (e.g., a SCP FQDN or target NF Instance ID), and/or the identifier of the entity forwarding the error. For example, the Custom header associated with an error generated by a SCP can comprise at least: "HTTP 503 Service Unavailable" and "3GPP-Sbi-Error: orig=scp; fqdn=scp1.com". As another example, the Custom header for an error forwarded by a SCP can comprise at least: "HTTP 503 Service Unavailable" and "3GPP-Sbi-Error: forw=scp; fqdn=scp1.com". Alternatively, the Custom header for an error generated by an PCF can comprise at least: "HTTP 429 Too Many Requests" and "3GPP-Sbi-Error: orig=pcf; nfInstanceId=54804518-4191-46b3-955c-ac631P953ed8", while the Custom header for a PCF error forwarded by a SCP can comprise at least: "HTTP 429 Too Many Requests" and "3GPP-Sbi-Error: orig=pcf; nfInstanceId=54804518-4191-46b3-955c-ac631f953ed8, forw=scp; fqdn=scp1.com". In some embodiments described below, the ProblemDetails component of an error response may also be extended with a new attribute indicating the originator of the error (e.g., NF type, NF Instance ID, IP address, FQDN, etc.).

As described above in conjunction with block 914 of FIG. 8, the apparatus 200 embodied by the NF client, e.g., NF service consumer or other client device, e.g., an HTTP client, is configured to respond differently to the error message contained in the service response depending upon the originator of the error. For example, the service request may be retransmitted or a subsequent service request may be transmitted in a manner that does not rely upon or communicate with the entity that previously created the error. Alternatively, the access request may be redirected. In an instance in which the originator of the error is a network proxy function, as opposed to the NF server, the service response may include redirection information indication an alternative network proxy function to be utilized in conjunction with the redirected service request. Although the redirection of the service request may be performed in various manners, one example of the manner in which the service request may be resubmitted is depicted in FIG. 10. In this regard, the method 1310 includes Block 1215 shows the apparatus 200 embodied by the NF client includes means, such as the processor 202, the communication interface 206 or the like, to cause a service request for a network function server, e.g., NF server, to be transmitted via at least one network proxy function, e.g. SCP, SEPP, etc. in the manner described above. As shown in Block 1216, the apparatus 200 include means, such as the processor 202, the communication interface 206 or the like, to receive a service response comprising at least an error message. The apparatus 200 also includes means, such as the processor 202 or the like, to determine from the service response that the request is to be redirected towards another network proxy function, as opposed to towards another network function server. See Block 1217. The apparatus 200 of this example embodiment additionally includes means, such as the processor 202 or the like, to identify the other network proxy function to which the service request is to be redirected based on an identification of the another network proxy function with the error message. Thus, as described in more detail below, the error message of this example embodiment may not only identify the network proxy function as the originator of the error, but may also identify another network proxy function to which the service request should be redirected. See Block 1218. With respect to identifying the network proxy function as the originator of the error, the service response may, for example, include a Server header or a Custom header that identifies the type of the entity, e.g., SCP or SEPP, and the identity of the entity, e.g., FQDN, that was the originator of the error. The service response may also identify the other network proxy function to which the service request should be redirected. Further, apparatus 200 of this example embodiment includes means, such as the processor 202, the communication interface 206 or the like, to redirect the service request for the same network function server via the other network proxy function that was identified by the error message, thereby avoiding the network proxy function that was the originator of the error. See Block 1219.

In one embodiment, the apparatus 200, such as the processor 202, is configured to determine from the service response that the request is to be redirected towards another network proxy function, as opposed to towards another network function server, by identifying an SCP_REDIRECTION protocol error in the error message. For example, the network proxy function that is the originator of the error may include an error message, such as a 503, 400 or 429 error, that includes a ProblemDetails structure that indications a protocol error of "SCP_REDIRECTION". i.e. SCP sends e.g. 503, 400, 429 . . . response with a ProblemDetails indicating "SCP_REDIRECTION" in the service response that is provided to the NF client. The apparatus 200, such as the processor 202, of this example embodiment may also be configured to identify another network proxy function to which the service request is to be redirected based upon an identity of the another network proxy function included within the ProblemDetails of the error message. In this regard, the ProblemDetails may also include a new attribute carrying the identify, such as the FQDN, of the other network proxy function, e.g., another SCP, towards which the service request should be redirected.

In another embodiment, the apparatus 200, such as the processor 202, is configured to determine from the service response that the request is to be redirected towards another network proxy function, as opposed to towards another network function server, by determining that the service response includes a Server header or a Custom header identifying the network proxy function as the originator. The apparatus 200, such as the processor 202, of this example embodiment is also configured to identify another network proxy function to which the service request is to be redirected based upon an identity of the another network proxy function included within a Location header of the service response or within the response payload (e.g. within problem details information). For example, the network proxy function that is the originator of the error may include an error message, such as a 307/308 redirection, that includes a Location header that identifies the identity, e.g., FQDN, of the other network proxy function to which the service request should be redirected. Coupled with the identification of the original network proxy function in the Server header or the Custom header, the NF client of this example embodiment interprets the error message as a request to redirect the service request to a different network proxy function, e.g., a different SCP with no change in the NF server to which the service request is targeted, e.g., 3gpp-Sbi-Target-apiRoot header.

Although described herein in conjunction with FIG. 10 in relation to the redirection of the service request by the NF service consumer or other client device, the redirection of the service request including the operations depicted in FIG. 10 may, instead, be performed by the SCP or other intermediate entity in another example embodiment.

Similar to the above described embodiment relating to the SCP_REDIRECTION protocol error, a protocol error "NF_REDIRECTION" may be defined and included, for example, by the NF server in the error response (e.g., HTTP error 503, 400, 429, etc.) with a ProblemDetails indicating "NF_REDIRECTION" and including, additionally, a new attribute identifying a different NF service producer to which the service request should be redirected, such as by providing the FQDN, or other network entity identification information, of the NF service producer toward which the service request should be redirected.

While FIGS. 8 and 11 illustrate the operations performed from the perspective of the NF client, e.g. an NF service consumer, NF servicer producer, or other client device and a SCP or other intermediate entity, respectively, FIG. 11 depicts a flowchart of a method 1310 performed, in some embodiments, by an apparatus 200 embodied by a NF server, such as the NF service producer, NF service consumer or other target server, e.g., HTTP server, is depicted. As shown in block 1311, the apparatus 200 embodied by the network server includes means, such as the processor 202, the communication interface 206 or the like, to receive a service request from a NF client. Referring to Block 1312, the apparatus 200 embodied by the network server includes means, such as the processor 202 or the like, to determine that an error condition exists relative to processing of the service request.

Block 1313 shows the apparatus 200 embodied by the NF server includes means, such as the processor 202 or the like, to identify an error message in relation to the error condition. And, Block 1314 shows the apparatus 200 embodied by the NF server includes means, such as the processor 202, the communication interface 206 or the like, to cause a service response to be transmitted to the NF client, such as via a SCP or other intermediate entity. The service response comprises at least the error message and includes an indication of the originator of the error identifying the type or identity of the origin, e.g., the 5GC NF type, a NF Instance ID, an IP address or other address, of the entity, such as the NF server, that is the originator of the error to permit the service request to be properly retransmitted or redirected as described above.

By way of non-limiting examples, some network communication error scenarios and solutions provided therefor in accordance with certain example embodiments will now be described. As used with reference to the described scenarios below, the symbol "/" is used to represent a new line.

In one example scenario, a first NF, that is, NF1, transmits a service request to a second NF, namely, NF2, through an intermediate entity, SCP, and an error XX occurs at NF2. NF2 returns a service response with an error message identifying NF2 as the source of the error, either with or without problem details, to the SCP and, in turn to NF1.

In one embodiment, NF2 adds "Server=NF2" identifying the originator of the error as NF2 and then the SCP adds "Via=SCP" identifying that the SCP is forwarding the error message. The NF service consumer, NF1, receives "Error XX/Server=NF2/Via=SCP" in the error message identifying the error XX, the originator of the error as NF2 as identified by the Server header, and the forwarding entity as the SCP as identified by the Via header. Based on the Server header, the NF service consumer, NF1, receives information identifying that the error occurred at NF2. Thus, NF1 can select a different NF service producer in the retransmitted service request or in a subsequent service request.

In another embodiment that uses a Custom header, the NF2 adds "3GPP-Sbi-Error: orig=NF2type; NFInstanceID=NF2" identifying the originator of the error as NF2 and then the SCP adds "3GPP-Sbi-Error: forw=scp; fqdn=SCP FQDN" identifying that the SCP is forwarding the error message. The NF service consumer, NF1, receives "Error XX/3GPP-Sbi-Error: orig=NF2type; /NFInstanceID=NF2, /forw=scp; fqdn=SCP/FQDN" in the error message identifying the error XX, the originator of the error is identified as NF2 by the Custom header, and the forwarding entity is identified as the SCP by the Custom header. Based on the custom 3GPP-Sbi-Error header, the NF service consumer, NF1, receives information identifying that the error occurred at NF2. As before, NF1 can select a different NF service producer in the retransmitted service request or subsequent service request.

In another example scenario, a first NF, NF1, transmits a service request to a second NF, NF2, through an intermediate entity, SCP, and an error XX occurs at the SCP. The SCP returns the error to the NF service consumer, NF1.

In an example embodiment, the SCP adds "Server=SCP" identifying that the SCP is the originator of the error. The NF service consumer, NF1, receives "Error XX/Server=SCP" in the error message identifying the error XX and the originator of the error is identified as SCP by the Server header. Based on the Server header, the NF service consumer receives information identifying that the error occurred at the SCP. Therefore, the NF service consumer, NF1, can select the same target NF2 via a different SCP in the retransmitted service request or subsequent service request.

In another embodiment using a Custom header, the SCP adds "3GPP-Sbi-Error=orig=scp; fqdn=SCP FQDN" identifying the originator of the error as the SCP. The NF service consumer, NF1, receives "Error XX/3GPP-Sbi-Error=orig=scp; fqdn=SCP/FQDN" in the error message identifying the error XX and the originator of the error is identified as SCP by the Custom header. Based on the custom 3GPP-Sbi-Error header, the NF service consumer, NF1, receives information identifying that the error occurred the SCP. Therefore, the NF service consumer, NF1, can select the same target NF2 via a different SCP in a retransmitted service request or subsequent service request.

In another example scenario, a first NF, NF1, transmits a service request to a second NF, NF2, through two intermediate entities, SCP1 and SCP2, and an error XX occurs at SCP2. SCP2 returns the error to the NF1.

In one embodiment, SCP2 adds "Server=SCP2" identifying the originator of the error as SCP2 and then the SCP1 adds "Via=SCP1" identifying that SCP1 is forwarding the error message. The NF service consumer, NF1, receives "Error XX/Server=SCP2/Via=SCP1" in the error message identifying the error XX, the originator of the error is identified as SCP2 by the Server header, and the forwarding entity is identified as SCP1 by the Via header. Based on the Server header and Via header, the NF service consumer, NF1, receives information identifying that the error occurred at SCP2. Therefore, the NF service consumer, NF1, can select the same target NF2 via the same SCP1 and a different SCP2 for a retransmitted service request. In some embodiments, based on the operator policy, SCP1 determines a different path (e.g., utilizing a different SCP2).

In another embodiment using a Custom header, SCP2 adds "3GPP-Sbi-Error=orig=scp; fqdn=SCP2 FQDN" identifying the originator of the error as SCP2 and then the SCP1, optionally, adds "3GPP-Sbi-Error=orig=scp; fqdn=SCP2 FQDN" identifying that the SCP1 is forwarding the error message. The NF service consumer, NF1, receives "Error XX/3GPP-Sbi-Error=orig=scp; fqdn=SCP2/FQDN" in the error message identifying the error XX, the originator of the error is identified as SCP2 by the Custom header, and the forwarding entity is identified as the SCP by the Custom header. Based on the custom 3GPP-Sbi-Error header, the NF service consumer, NF1, receives information identifying that the error occurred at SCP2. Therefore, the NF service consumer, NF1, can select the same target NF2 via the same SCP1 and a different SCP2 in a retransmission request. In some embodiments, based on the operator policy, SCP1 determines a different path (e.g., utilizing a different SCP2).

In another example scenario, a first NF, NF1, transmits a service request to a second NF, NF2, through an intermediate entity, SCP1, and an error XX occurs at SCP1. SCP1 then redirects NF1 to another SCP, namely, SCP2.

In an example embodiment, SCP1, optionally, adds "Server=SCP1" identifying the originator of the error as SCP1 and then the SCP1 adds ProblemDetails including "SCP_REDIRECTION" and a new attribute indicating the "SCP FQDN" identifying that the SCP1 is redirecting the communication to SCP2. The NF service consumer, NF1, receives "Error 307/308/Server=SCP1/ProblemDetails:" that includes "SCP_REDIRECTION" and the new attribute indicating the "SCP FQDN" in the error message which serves to identify the error XX. Additionally, the originator of the error is identified as SCP1 by the optional Server header, and the redirection to SCP2 identified by the ProblemDetails. Based on the identified error code, Server header, and ProblemDetails, the NF service consumer, NF1, receives information identifying that the error occurred at SCP1 and SCP1 requests a redirection to SCP2.

In another example embodiment using a Custom header, SCP1 adds "3GPP-Sbi-Error=orig=scp1" and "Location header=SCP2" identifying the originator of the error as SCP1 and the SCP2 as the redirection location. The NF service consumer, NF1, receives "Error XX/3GPP-Sbi-SCP-Error=SCP1/Location header=SCP2" in the error message identifying the error XX, the originator of the error is identified as SCP1 by the Custom header, and the redirection entity is identified as SCP2 by the Custom header. Based on the Custom header, the NF service consumer, NF1, receives information identifying that the error occurred at SCP1 and SCP1 requests a redirection to SCP2.

In another example scenario, a first NF, NF1, transmits a service request to a second NF, NF2, through an intermediate entity, SCP1, and NF2 then redirects to another NF, NF3.

In an example embodiment, NF2 adds "Location header=NF3" and includes "NF_REDIRECTION" in the error message along with a new attribute indicating the "NF_FQDN" that identifies NF3 to which NF2 is redirecting the service request. The NF service consumer, NF1, receives "Error 307/308/Location header=NF3" in the error message identifying the redirection. Based on the Location header, the NF service consumer, NF1, receives information identifying that NF2 requests a redirection to NF3.

In another example embodiment using a Custom header, NF2 adds "3GPP-Sbi-Error=orig=NF2type" and "Location header=NF3" identifying the originator as NF2 and the NF3 as the redirection location. SCP1 further adds "Via=SCP1" when transmitting the service response to NF1. The NF service consumer, NF1, receives "Error 307/308/Location header=NF3/Via=SCP1" in the error message identifying the redirection. Based on the Location header, the NF service consumer, NF1, receives information via SCP1 identifying that NF2 requests a redirection to NF3.

In another example scenario, a timeout occurs at the NF client, NF1, because no response is received from the requested SCP during a predefined and tracked amount of time from the initiation of the service request made by NF client. Based on predefined operator policy, the NF client defines key performance indicators (KPIs), such as, response time before timeout. The NF client is configured to then decide to select a different SCP and to resubmit the service request if the timeout interval threshold is reached. In some embodiments, the NF client defines a plurality of KPI thresholds, such as, predefined timeout intervals, window(s), minimum number of call attempts, blocked network locations, allowed network locations, or the like, or any combination thereof. For example, if other service requests are successful and the KPI is high, the NF client may be configured to determine that the issue is likely with the NF server and will define a different NF server for the service request. Additionally, the NF client may be configured to determine that if suddenly many service requests timeout, such as more than a predefined number of service requests, and the KPI degradation threshold is met, the issue is likely at the SCP and may identify a different SCP for the service requests.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 204, of an apparatus, e.g., 200, employing an embodiment of the present invention and executed by processor, e.g., 202, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above can be modified or further amplified. Furthermore, in some embodiments, additional optional operations can be included. Modifications, additions, subtractions, inversions, correlations, proportional relationships, disproportional relationships, attenuation and/or amplifications to the operations above can be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

We claim:

1. A method comprising:
   causing a service request for a network function server to be transmitted via at least one of a service communication proxy (SCP) or a security edge protection proxy;
   receiving a service response comprising at least an error message and a header that includes an indication as to an originator of the error message;
   determining from the service response, the originator of the error message, wherein the originator of the error message is at least one of the network function server, the service communication proxy (SCP) or the security edge protection proxy (SEPP);
   in an instance in which the originator of the error message is the SCP or the SEPP, causing the service request to be transmitted to the network function server via a different SCP or a different SEPP; and
   in an instance in which the originator of the error message is the network function server, causing the service request to be transmitted to a different network function server.

2. The method according to claim 1, wherein the header of the service response further comprises an indication that the service response has been relayed by a service communication proxy (SCP) or a security edge protection proxy (SEPP).

3. The method according to claim 2, wherein the service response comprises an HTTP Server header that includes a type or an identity of the originator of the error message, or an HTTP Via header that includes a type or an identity of the service communication proxy (SCP) or the security edge protection proxy (SEPP) relaying the service response.

4. The method according to claim 3, wherein determining from the service response the originator of the error message comprises determining, in an instance in which the Via header indicates that the service communication proxy (SCP) or the security edge protection proxy (SEPP) relayed the error message or in an instance in which the HTTP Server header identifies the type or the identity of the network function server as the originator of the error message, that the originator of the error message is not the service communication proxy (SCP) or the security edge protection proxy (SEPP) that provided the service.

5. The method according to claim 3, wherein the identity of the originator of the error message comprises a fully qualified domain name (FQDN) or an network function instance identifier.

6. The method according to claim 3, wherein the identity of the service communication proxy (SCP) or the security edge protection proxy (SEPP) relaying the service response is a fully qualified domain name (FQDN), an network function instance identifier or a network entity identifier.

7. The method according to claim 1, wherein, in the instance in which the originator of the error message is the network function server, the service request is caused to be transmitted to the different network function server using the same or a different SCP and the same or a different SEPP.

8. An apparatus comprising: at least one processor; and at least one memory including computer program code, the at least one memory and the computer program code configured to, with the at least one processor, cause the apparatus at least to perform:
   cause a service request for a network function server to be transmitted via at least one of a service communication proxy (SCP) or a security edge protection proxy;
   receive a service response comprising at least an error message and a header that includes an indication as to an originator of the error message;
   determine from the service response, the originator of the error message, wherein the originator of the error message is at least one of the network function server, the service communication proxy (SCP) or the security edge protection proxy (SEPP);
   in an instance in which the originator of the error message is the SCP or the SEPP, cause the service request to be transmitted to the network function server via a different SCP or a different SEPP; and
   in an instance in which the originator of the error message is the network function server, cause the service request to be transmitted to a different network function server.

9. The apparatus according to claim 8, wherein the header of the service response further comprises an indication that the response has been relayed by a service communication proxy (SCP) or a security edge protection proxy (SEPP).

10. The apparatus according to claim 9, wherein the service response comprises an HTTP Server header that includes a type or an identity of the originator of the error message, or an HTTP Via header that includes a type or an identity of the service communication proxy (SCP) or the security edge protection proxy (SEPP) relaying the service response.

11. The apparatus according to claim 10, wherein the at least one memory and the computer program code are configured to, with the at least one processor, cause the apparatus to determine from the service response the originator of the error message by determining, in an instance in which the Via header indicates that the service communication proxy (SCP) or the security edge protection proxy (SEPP) relayed the error message or in an instance in which the HTTP Server header identifies the type or the identity of the network function server as the originator of the error message, that the originator of the error message is not the service communication proxy (SCP) or the security edge protection proxy (SEPP) that provided the service.

12. The apparatus according to claim 10, wherein the identity of the originator of the error message comprises a fully qualified domain name (FQDN) or a network function instance identifier.

13. The apparatus according to claim 8, wherein
   in the instance in which the originator of the error message is the network function server, the service request is caused to be transmitted to the different network function server using the same or a different SCP and the same or a different SEPP.

14. The apparatus according to claim 13, wherein the identity of the service communication proxy (SCP) or the security edge protection proxy (SEPP) relaying the service response is a fully qualify domain name (FQDN), a network function instance identifier or a network entity identifier.

15. A computer program product comprising a non-transitory computer readable storage medium having program code portions stored thereon, the program code portions configured, upon execution, to perform:

cause a service request for a network function server to be transmitted via at least one of a service communication proxy (SCP) or a security edge protection proxy;

receive a service response comprising at least an error message and a header that includes an indication as to an originator of the error message;

determine from the service response, the originator of the error message, wherein the originator of the error message is at least one of the network function server, the service communication proxy (SCP) or the security edge protection proxy (SEPP);

in an instance in which the originator of the error message is the SCP or the SEPP, cause the service request to be transmitted to the network function server via a different SCP or a different SEPP; and in an instance in which the originator of the error message is the network function server, cause the service request to be transmitted to a different network function server.

16. The computer program product according to claim 15, wherein, in the instance in which the originator of the error message is the network function server, the service request is caused to be transmitted to the different network function server using the same or a different SCP and the same or a different SEPP.

17. The computer program product according to claim 15, wherein the header of the service response further comprises an indication that the service response has been relayed by a service communication proxy (SCP) or a security edge protection proxy (SEPP).

* * * * *

UNITED STATES PATENT AND TRADEMARK OFFICE
CERTIFICATE OF CORRECTION

PATENT NO. : 11,784,869 B2
APPLICATION NO. : 17/205892
DATED : October 10, 2023
INVENTOR(S) : Bruno Landais et al.

Page 1 of 1

It is certified that error appears in the above-identified patent and that said Letters Patent is hereby corrected as shown below:

In the Claims

In Column 33, Line 59, Claim 5, delete "an network" and insert -- a network --, therefor.

In Column 33, Line 64, Claim 6, delete "an network" and insert -- a network --, therefor.

Signed and Sealed this
Twenty-seventh Day of February, 2024

Katherine Kelly Vidal
*Director of the United States Patent and Trademark Office*